United States Patent
Parsons et al.

(10) Patent No.: US 9,763,393 B2
(45) Date of Patent: Sep. 19, 2017

(54) AUTOMATED WATER DELIVERY SYSTEMS WITH FEEDBACK CONTROL

(75) Inventors: Natan E. Parsons, Brookline, MA (US); Fatih Guler, Winchester, MA (US); Kay Herbert, Winthrop, MA (US)

(73) Assignee: SLOAN VALVE COMPANY, Franklin Park, IL (US)

( * ) Notice: Subject to any disclaimer, the term of this patent is extended or adjusted under 35 U.S.C. 154(b) by 287 days.

(21) Appl. No.: 12/381,870

(22) Filed: Mar. 17, 2009

(65) Prior Publication Data

US 2009/0179165 A1    Jul. 16, 2009

Related U.S. Application Data

(60) Division of application No. 11/022,373, filed on Dec. 22, 2004, now abandoned, which is a continuation of
(Continued)

(51) Int. Cl.
*F16K 31/40* (2006.01)
*A01G 25/16* (2006.01)
(Continued)

(52) U.S. Cl.
CPC .......... *A01G 25/16* (2013.01); *A01G 25/167* (2013.01); *E03C 1/057* (2013.01); *E03D 3/02* (2013.01); *F16K 31/02* (2013.01); *Y10T 137/189* (2015.04)

(58) Field of Classification Search
CPC ...... A01G 25/16; A01G 25/167; F16K 31/02; F16K 31/40–31/408; E03D 3/02; E03C 1/057; Y10T 137/189
(Continued)

(56) References Cited

U.S. PATENT DOCUMENTS

| 207,482 A | 8/1878 | Blessing ........................ 137/188 |
| 1,501,331 A | 7/1924 | Gulick ........................... 137/245 |

(Continued)

FOREIGN PATENT DOCUMENTS

| EP | 0848193 A1 | 6/1998 |
| GB | 1532210 | 11/1978 |
| WO | WO 97/04262 | 2/1997 |

OTHER PUBLICATIONS

International Search Report issued in PCT Application PCT/US03/20117 mailed on Dec. 18, 2003.

*Primary Examiner* — John Bastianelli
(74) *Attorney, Agent, or Firm* — Ivan David Zitkovsky

(57) ABSTRACT

A water delivery system includes a water input port, a control circuit, and a valve device. The water input port is constructed to be coupled to a water conduit receiving water from a remotely located water source. The valve device includes an actuator located near and connected to the water input port; wherein the valve device is constructed to receive control signals from the controller for providing water to a water delivery unit. The controller may be battery operated. The actuator may be a latching actuator, a non-latching actuator, or an isolated latching actuator. The controller may include a microcontroller coupled and to a sensor. The system may include a communication interface constructed and arranged to provide data to the microcontroller. The control circuit may include a power consumption controller. The control circuit includes a voltage regulator.

12 Claims, 27 Drawing Sheets

Related U.S. Application Data application No. PCT/US03/20117, filed on Jun. 24, 2003, which is a continuation-in-part of application No. PCT/US02/38757, filed on Dec. 4, 2002, and a continuation-in-part of application No. PCT/US02/38758, filed on Dec. 4, 2002.

(60) Provisional application No. 60/391,282, filed on Jun. 24, 2002, provisional application No. 60/391,284, filed on Jun. 24, 2002.

(51) Int. Cl.
*F16K 31/02* (2006.01)
*E03C 1/05* (2006.01)
*E03D 3/02* (2006.01)

(58) Field of Classification Search
USPC ..... 251/30.01–30.05, 129.11–129.13, 129.04
See application file for complete search history.

(56) References Cited

U.S. PATENT DOCUMENTS

| | | | |
|---|---|---|---|
| 2,438,207 A | 3/1948 | Derby | 4/304 |
| 2,471,328 A | 5/1949 | Jones | 137/403 |
| 2,507,966 A | 5/1950 | Filliung | 4/303 |
| 2,603,794 A | 7/1952 | Bokser | 4/304 |
| 2,619,122 A | 11/1952 | Hunter | 251/120 |
| 2,619,986 A | 12/1952 | Goepfrich et al. | 251/129.17 |
| 2,685,301 A | 8/1954 | Dreier | 137/386 |
| 2,758,811 A * | 8/1956 | Peterson | 251/29 |
| 2,827,073 A | 3/1958 | Owens | 137/426 |
| 2,842,400 A | 7/1958 | Booth et al. | 239/569 |
| 2,877,791 A | 3/1959 | Rich | 137/487 |
| 2,923,314 A | 2/1960 | Badger, Jr. et al. | 137/414 |
| 2,986,155 A | 5/1961 | Doyle | 137/218 |
| 2,999,191 A | 9/1961 | Muradian et al. | 361/195 |
| 3,011,751 A * | 12/1961 | Delany et al. | 251/30.03 |
| 3,019,453 A | 2/1962 | Radcliffe | 4/249 |
| 3,022,450 A | 2/1962 | Chase, Jr. | 361/194 |
| 3,034,151 A | 5/1962 | Filliung | 4/249 |
| 3,056,143 A | 10/1962 | Foster | 4/249 |
| 3,058,485 A | 10/1962 | McQueen | 137/403 |
| 3,098,635 A | 7/1963 | Delaporte et al. | 251/54 |
| 3,151,340 A | 10/1964 | Teshima | 251/129.04 |
| 3,242,940 A | 3/1966 | Sirotek | 137/218 |
| 3,254,664 A | 6/1966 | Delaney et al. | 137/244 |
| 3,285,261 A | 11/1966 | Chaney | 137/505.12 |
| 3,314,081 A | 4/1967 | Atkins et al. | 4/304 |
| 3,318,565 A | 5/1967 | Cutler | 251/45 |
| 3,369,205 A | 2/1968 | Hamrick | 335/177 |
| 3,373,449 A | 3/1968 | Rusnok | 4/305 |
| 3,379,214 A | 4/1968 | Weinberg | 137/625.5 |
| 3,386,462 A | 6/1968 | Walters | 137/244 |
| 3,400,731 A | 9/1968 | McCormack | 137/245 |
| 3,406,941 A | 10/1968 | Ichimori et al. | 251/129.01 |
| 3,429,333 A | 2/1969 | Schoepe et al. | |
| 3,480,787 A | 11/1969 | Johansen | 250/221 |
| 3,487,477 A | 1/1970 | Classen | 4/668 |
| 3,495,803 A | 2/1970 | Schoepe et al. | 251/25 |
| 3,495,804 A | 2/1970 | Muller et al. | 251/36 |
| 3,559,675 A | 2/1971 | Schoepe et al. | 137/436 |
| 3,575,640 A | 4/1971 | Ishikawa | 361/181 |
| 3,576,277 A | 4/1971 | Blackman | 222/1 |
| 3,586,017 A | 6/1971 | Walters | 137/59 |
| 3,606,241 A | 9/1971 | Bornholdt | 251/52 |
| 3,638,680 A | 2/1972 | Kopp | 137/606 |
| 3,639,920 A | 2/1972 | Griffin et al. | 4/623 |
| 3,670,167 A | 6/1972 | Forbes | 250/221 |
| 3,693,649 A | 9/1972 | Gordon et al. | 137/414 |
| 3,724,001 A | 4/1973 | Ichimori et al. | 4/623 |
| 3,740,019 A * | 6/1973 | Kessell et al. | 251/129.17 |
| D228,782 S | 10/1973 | Taiani | D13/153 |
| 3,763,881 A | 10/1973 | Jones | 137/414 |
| 3,778,023 A | 12/1973 | Billeter | 251/30.01 |
| 3,791,619 A | 2/1974 | Pett | 251/45 |
| 3,799,198 A | 3/1974 | Kijimoto | 137/624.11 |
| 3,802,462 A | 4/1974 | Trösch | 137/556 |
| 3,812,398 A | 5/1974 | Kozel et al. | 251/331 |
| 3,814,376 A | 6/1974 | Reinicke | 251/65 |
| 3,821,967 A | 7/1974 | Sturman et al. | 137/624.15 |
| 3,842,857 A | 10/1974 | McCornack | 137/242 |
| 3,863,196 A | 1/1975 | Hilles | 367/96 |
| 3,895,645 A | 7/1975 | Johnson | 137/403 |
| 3,911,955 A * | 10/1975 | Link | 251/30.02 |
| 3,951,098 A | 4/1976 | Meyers | 116/206 |
| 3,967,808 A * | 7/1976 | Lieding | 251/46 |
| 4,010,769 A | 3/1977 | De Lorenzo et al. | 137/312 |
| 4,065,095 A | 12/1977 | Johnson | 251/118 |
| 4,097,786 A | 6/1978 | Lund | 318/282 |
| 4,105,186 A | 8/1978 | Eby | 251/35 |
| 4,107,046 A | 8/1978 | Corder | 210/282 |
| 4,114,647 A | 9/1978 | Sturman et al. | 137/624.2 |
| 4,116,377 A | 9/1978 | Andersson et al. | 236/12.1 |
| 4,135,696 A * | 1/1979 | Saarem et al. | 251/30.02 |
| 4,141,091 A | 2/1979 | Pulvari | 4/313 |
| 4,179,691 A | 12/1979 | Keller | 340/567 |
| 4,184,445 A | 1/1980 | Burrows | 116/206 |
| 4,206,901 A | 6/1980 | Williams | 251/35 |
| 4,207,466 A | 6/1980 | Drage et al. | 250/338.1 |
| 4,223,698 A | 9/1980 | Reinicke | 137/595 |
| 4,225,111 A | 9/1980 | Stahle | 251/87 |
| 4,226,259 A * | 10/1980 | Szekely et al. | 137/269 |
| 4,229,811 A | 10/1980 | Salem | 367/93 |
| 4,231,287 A | 11/1980 | Smiley | 92/94 |
| 4,241,759 A | 12/1980 | Billeter | 137/636.4 |
| 4,272,052 A | 6/1981 | Gidner | 251/39 |
| 4,280,680 A | 7/1981 | Payne | 51/175 |
| 4,282,430 A | 8/1981 | Hatten et al. | 250/221 |
| 4,295,485 A | 10/1981 | Waterfield | 137/74 |
| 4,295,631 A | 10/1981 | Allen | 251/30.03 |
| 4,295,653 A | 10/1981 | Coles | 277/320 |
| 4,304,391 A | 12/1981 | Yamaguchi | 251/129.05 |
| 4,309,781 A | 1/1982 | Lissau | 4/304 |
| 4,383,234 A | 5/1983 | Yatsushiro et al. | 335/253 |
| 4,396,149 A | 8/1983 | Hirsch | 239/63 |
| 4,402,095 A | 9/1983 | Pepper | 4/623 |
| 4,408,745 A | 10/1983 | Swiers et al. | 251/357 |
| 4,457,452 A | 7/1984 | Symmons | 222/20 |
| 4,488,702 A | 12/1984 | Lapeyre | 251/46 |
| 4,504,038 A * | 3/1985 | King | 251/63.5 |
| 4,505,450 A * | 3/1985 | Saarem et al. | 251/24 |
| 4,505,451 A | 3/1985 | Jonas | 51/285 |
| 4,508,136 A * | 4/1985 | Kah, Jr. | 137/218 |
| 4,520,516 A | 6/1985 | Parsons | 4/623 |
| 4,539,474 A | 9/1985 | Takahata | 250/221 |
| 4,543,991 A | 10/1985 | Fuchs | 137/595 |
| 4,570,272 A | 2/1986 | Kawaguchi et al. | 4/302 |
| 4,570,899 A | 2/1986 | Kingham | 251/51 |
| 4,597,895 A | 7/1986 | Bartlett | 252/392 |
| 4,604,735 A | 8/1986 | Parsons | 367/93 |
| 4,606,085 A | 8/1986 | Davies | 4/623 |
| 4,609,178 A | 9/1986 | Baumann | 251/229 |
| 4,611,356 A | 9/1986 | Lin | 4/301 |
| 4,613,764 A | 9/1986 | Lobato | 307/116 |
| 4,624,441 A * | 11/1986 | Kreitchman et al. | 251/30.01 |
| 4,645,094 A | 2/1987 | Acklin et al. | 222/52 |
| 4,651,777 A | 3/1987 | Hardman | 137/487.5 |
| 4,653,534 A | 3/1987 | Chung-Shan | 137/624.12 |
| 4,662,563 A | 5/1987 | Wolfe, Jr. | 239/1 |
| 4,669,653 A | 6/1987 | Avelov | 236/12.13 |
| 4,681,141 A | 7/1987 | Wang | 7/607 |
| 4,684,920 A | 8/1987 | Reiter | 340/310.11 |
| 4,693,419 A | 9/1987 | Weintraub et al. | 239/63 |
| 4,709,427 A | 12/1987 | Laverty, Jr. | 4/427 |
| 4,709,728 A | 12/1987 | Ying-Chung | 137/636.4 |
| 4,717,237 A | 1/1988 | Austin | 385/101 |
| 4,729,342 A | 3/1988 | Loctin | 119/163 |
| 4,756,031 A | 7/1988 | Barrett | 4/407 |
| 4,767,922 A | 8/1988 | Stauffer | 250/221 |
| 4,787,411 A | 11/1988 | Moldenhauer | 137/244 |
| 4,793,588 A | 12/1988 | Laverty, Jr. | 251/30.03 |
| 4,796,654 A | 1/1989 | Simpson | 137/78.3 |
| 4,796,662 A | 1/1989 | Hoffmann et al. | 137/596.16 |

(56) References Cited

U.S. PATENT DOCUMENTS

| | | | |
|---|---|---|---|
| 4,805,247 A | 2/1989 | Laverty, Jr. | 4/304 |
| 4,811,221 A * | 3/1989 | Sturman et al. | 700/284 |
| 4,823,414 A | 4/1989 | Piersimoni et al. | 4/623 |
| 4,823,825 A | 4/1989 | Buchl | 137/1 |
| 4,826,129 A | 5/1989 | Fong et al. | 251/129.04 |
| 4,826,132 A | 5/1989 | Moldenhauer | 251/129.17 |
| 4,832,263 A | 5/1989 | Poynor | 239/197 |
| 4,832,582 A | 5/1989 | Buffet | 417/413.1 |
| 4,836,641 A | 6/1989 | Priaroggia | 385/100 |
| 4,839,039 A | 6/1989 | Parsons et al. | 210/143 |
| 4,887,032 A | 12/1989 | Hetrick | 324/207.16 |
| 4,891,864 A | 1/1990 | Laverty, Jr. | 91/399 |
| 4,893,645 A | 1/1990 | Augustinas et al. | 137/315.03 |
| 4,894,698 A | 1/1990 | Hijikigawa et al. | 257/254 |
| 4,894,874 A | 1/1990 | Wilson | 4/623 |
| 4,901,750 A | 2/1990 | Nicklas et al. | 137/270 |
| 4,902,887 A | 2/1990 | Everett, Jr. | 250/221 |
| 4,910,487 A | 3/1990 | Kleinhappl | 335/234 |
| 4,911,401 A * | 3/1990 | Holcomb et al. | 251/30.03 |
| 4,915,347 A | 4/1990 | Iqbal et al. | 251/30.03 |
| 4,919,165 A | 4/1990 | Lloyd | 37/78.2 |
| 4,921,208 A | 5/1990 | LaMarca | 251/30.04 |
| 4,921,211 A | 5/1990 | Novak et al. | 251/129.04 |
| 4,922,433 A | 5/1990 | Mark | 700/284 |
| 4,932,430 A | 6/1990 | Fernstrom | 137/85 |
| 4,934,400 A | 6/1990 | Cuming | 137/78.3 |
| 4,938,384 A | 7/1990 | Pilolla et al. | 222/50 |
| 4,941,215 A | 7/1990 | Liu | 4/406 |
| 4,941,219 A | 7/1990 | Van Marcke | 4/623 |
| 4,944,487 A | 7/1990 | Holtermann | 251/129.17 |
| 4,953,141 A | 8/1990 | Novak et al. | 367/100 |
| 4,953,236 A | 9/1990 | Lee et al. | 4/668 |
| 4,962,790 A | 10/1990 | Chou et al. | 137/599.08 |
| 4,972,070 A | 11/1990 | Laverty, Jr. | 250/221 |
| 4,977,929 A | 12/1990 | Chinnock et al. | 137/863 |
| 4,988,074 A | 1/1991 | Najmolhoda | 251/129.08 |
| 4,991,819 A | 2/1991 | Laube | 51/35 |
| 4,998,673 A | 3/1991 | Pilolla | 239/67 |
| 5,025,516 A | 6/1991 | Wilson | 4/623 |
| 5,027,850 A | 7/1991 | Peterson et al. | 137/245 |
| 5,032,812 A | 7/1991 | Banick et al. | 335/17 |
| 5,036,553 A | 8/1991 | Sanderson | 4/313 |
| 5,060,859 A | 10/1991 | Bancroft | 239/64 |
| 5,062,164 A | 11/1991 | Lee et al. | 4/677 |
| 5,062,453 A | 11/1991 | Saadi et al. | 137/624.11 |
| 5,074,468 A * | 12/1991 | Yamamoto et al. | 239/69 |
| 5,074,520 A | 12/1991 | Lee et al. | 251/40 |
| 5,092,560 A | 3/1992 | Chen | 251/30.03 |
| 5,095,944 A | 3/1992 | Hochstrasser | 137/607 |
| 5,109,885 A | 5/1992 | Tauscher | 137/554 |
| 5,109,886 A | 5/1992 | Takata et al. | 137/596.17 |
| 5,111,846 A | 5/1992 | Hochstrasser et al. | 137/607 |
| 5,125,621 A | 6/1992 | Parsons et al. | 251/30.03 |
| 5,127,625 A | 7/1992 | Kleinhappl | 251/129.17 |
| 5,148,826 A | 9/1992 | Bakhshaei | 137/80 |
| 5,148,985 A | 9/1992 | Bancroft | 239/64 |
| 5,169,118 A * | 12/1992 | Whiteside | 251/30.03 |
| 5,172,193 A | 12/1992 | Payne et al. | 356/445 |
| 5,181,538 A | 1/1993 | Manganaro | 137/607 |
| 5,188,337 A | 2/1993 | Mertens et al. | 251/129.14 |
| 5,195,720 A | 3/1993 | Nortier et al. | 251/129.04 |
| 5,202,666 A | 4/1993 | Knippscheer | 340/573.1 |
| 5,213,303 A | 5/1993 | Walker | 251/30.02 |
| 5,213,305 A | 5/1993 | Whiteside et al. | 251/40 |
| 5,224,685 A | 7/1993 | Chiang et al. | 251/129.04 |
| 5,232,194 A | 8/1993 | Saadi et al. | 251/40 |
| 5,238,023 A * | 8/1993 | Olofsson | 137/596.17 |
| 5,244,179 A | 9/1993 | Wilson | 251/30.03 |
| 5,245,024 A | 9/1993 | Scarpa et al. | 536/56 |
| 5,251,188 A | 10/1993 | Parsons et al. | 367/140 |
| 5,255,398 A | 10/1993 | Flynn et al. | 4/496 |
| 5,265,594 A | 11/1993 | Olsson et al. | 128/204.18 |
| 5,265,843 A | 11/1993 | Kleinhappl | 251/129.17 |
| 5,295,654 A | 3/1994 | Laube | 251/35 |
| 5,295,655 A | 3/1994 | Wilson et al. | 251/40 |
| 5,299,592 A | 4/1994 | Swanson | 137/59 |
| 5,301,919 A * | 4/1994 | May | 251/30.02 |
| 5,313,673 A | 5/1994 | Saadi et al. | 4/313 |
| 5,315,719 A | 5/1994 | Tsutsui et al. | 4/300 |
| 5,318,269 A * | 6/1994 | Oettinger et al. | 251/30.01 |
| 5,329,965 A | 7/1994 | Gordon | 137/599.07 |
| 5,335,694 A | 8/1994 | Whiteside | 137/625.37 |
| 5,339,859 A | 8/1994 | Bowman | 137/337 |
| 5,341,839 A * | 8/1994 | Kobayashi et al. | 137/505.13 |
| 5,375,811 A | 12/1994 | Reinicke | 251/129.16 |
| D354,113 S | 1/1995 | Wortier et al. | D23/233 |
| D355,478 S | 2/1995 | Allen et al. | D23/249 |
| 5,408,369 A | 4/1995 | Miura et al. | 360/75 |
| D357,976 S | 5/1995 | Allen et al. | D23/249 |
| 5,412,816 A | 5/1995 | Paterson et al. | 4/623 |
| 5,427,350 A * | 6/1995 | Rinkewich | 251/30.01 |
| 5,427,351 A | 6/1995 | Korfgen et al. | 251/39 |
| 5,431,181 A | 7/1995 | Saadi et al. | 137/15.11 |
| 5,433,245 A | 7/1995 | Prather et al. | 137/554 |
| 5,455,971 A | 10/1995 | Sakakibara et al. | 4/313 |
| 5,456,279 A | 10/1995 | Parsons et al. | 137/245 |
| 5,456,448 A | 10/1995 | Chou | 51/230 |
| 5,464,041 A | 11/1995 | Reinicke | 137/595 |
| 5,467,799 A | 11/1995 | Buccicone et al. | 137/625.41 |
| 5,473,723 A | 12/1995 | Stockman et al. | 385/134 |
| 5,474,303 A | 12/1995 | Coles | 277/317 |
| 5,481,187 A | 1/1996 | Marcott et al. | 324/207.16 |
| 5,508,510 A | 4/1996 | Laverty et al. | 250/221 |
| 5,511,579 A | 4/1996 | Price | 37/337 |
| 5,535,781 A | 7/1996 | Paterson et al. | 137/624.11 |
| 5,539,198 A | 7/1996 | McMichael et al. | 250/221 |
| 5,548,119 A | 8/1996 | Nortier | 250/341.1 |
| 5,555,912 A | 9/1996 | Saadi et al. | 137/801 |
| 5,564,462 A | 10/1996 | Storch | 137/337 |
| 5,566,702 A | 10/1996 | Philipp | 137/1 |
| 5,570,869 A | 11/1996 | Diaz et al. | 251/129.04 |
| 5,574,617 A | 11/1996 | Shimanuki et al. | 361/154 |
| 5,583,434 A | 12/1996 | Moyers et al. | 324/207.16 |
| 5,584,465 A | 12/1996 | Ochsenreiter | 251/65 |
| 5,595,216 A | 1/1997 | Pilolla | 137/607 |
| 5,599,003 A | 2/1997 | Seemann et al. | 251/30.03 |
| 5,600,237 A | 2/1997 | Nippert | 324/207.16 |
| 5,636,601 A | 6/1997 | Moriya et al. | 123/90.11 |
| D381,008 S | 7/1997 | Parsons et al. | D13/153 |
| 5,655,747 A | 8/1997 | Pasut | 251/30.03 |
| 5,655,748 A | 8/1997 | Regelbrugge et al. | 251/54 |
| 5,668,366 A | 9/1997 | Mauerhofer | 250/221 |
| 5,680,879 A | 10/1997 | Sheih et al. | 137/240 |
| 5,708,355 A | 1/1998 | Schrey | 323/282 |
| 5,716,038 A | 2/1998 | Scarffe | 251/30.03 |
| 5,735,456 A * | 4/1998 | Marin et al. | 236/75 |
| 5,747,684 A | 5/1998 | Pace et al. | 73/119 A |
| 5,749,521 A | 5/1998 | Lattery | 239/64 |
| 5,758,688 A | 6/1998 | Hamanaka et al. | 137/624.11 |
| D396,090 S | 7/1998 | Marcichow et al. | D23/233 |
| 5,775,372 A | 7/1998 | Houlihan | 137/624.12 |
| 5,785,955 A | 7/1998 | Fischer | 424/49 |
| 5,787,915 A | 8/1998 | Byers et al. | 137/1 |
| 5,787,924 A | 8/1998 | Cewers et al. | 137/487.5 |
| 5,797,360 A | 8/1998 | Pischinger et al. | 123/90.11 |
| 5,804,962 A | 9/1998 | Kather et al. | 324/207.16 |
| 5,815,362 A | 9/1998 | Kahr et al. | 361/153 |
| 5,819,336 A | 10/1998 | Gilliam et al. | 4/623 |
| 5,836,339 A | 11/1998 | Klever et al. | 137/78.2 |
| 5,839,660 A | 11/1998 | Morgenstern et al. | 239/63 |
| 5,881,993 A | 3/1999 | Wilson et al. | 251/40 |
| 5,883,557 A | 3/1999 | Pawlak et al. | 335/179 |
| 5,887,848 A | 3/1999 | Wilson | 251/40 |
| 5,900,201 A | 5/1999 | Chatterjee et al. | 264/109 |
| 5,901,384 A | 5/1999 | Sim | 4/313 |
| 5,905,625 A | 5/1999 | Schebitz | 361/154 |
| 5,918,855 A | 7/1999 | Hamanaka et al. | 251/129.04 |
| 5,927,328 A | 7/1999 | Nelson et al. | 137/624.12 |
| 5,927,603 A | 7/1999 | McNabb | 239/63 |
| 5,941,505 A | 8/1999 | Nagel | 51/335.2 |
| 5,950,983 A | 9/1999 | Jahrling | 251/129.04 |
| 5,964,192 A | 10/1999 | Ishii | 123/90.11 |
| 5,967,182 A | 10/1999 | Wilson | 137/544 |
| 5,979,500 A | 11/1999 | Jahrling et al. | 137/624.12 |

(56) References Cited

U.S. PATENT DOCUMENTS

| | | | |
|---|---|---|---|
| 5,984,262 A | 11/1999 | Parsons et al. | 251/129.04 |
| 5,996,965 A | 12/1999 | Eichholz et al. | 251/30.05 |
| 6,000,674 A | 12/1999 | Cheng | 251/26 |
| 6,003,170 A | 12/1999 | Humpert et al. | 4/623 |
| 6,024,059 A | 2/2000 | Kamimaru et al. | 123/90.11 |
| 6,039,067 A | 3/2000 | Houlihan | 137/337 |
| 6,044,699 A | 4/2000 | Greenblatt et al. | 73/170.17 |
| 6,044,814 A | 4/2000 | Fuwa | 123/90.11 |
| 6,056,261 A | 5/2000 | Aparicio et al. | 251/129.03 |
| 6,058,647 A | 5/2000 | Emalfarb | 47/1.01 R |
| 6,073,904 A | 6/2000 | Diller et al. | 251/30.03 |
| 6,082,315 A * | 7/2000 | Schneider | F01L 9/04 123/188.13 |
| 6,082,703 A * | 7/2000 | Fava et al. | 251/30.03 |
| 6,085,790 A | 7/2000 | Humpert et al. | 137/801 |
| 6,109,167 A * | 8/2000 | Vertanen | 251/63.6 |
| 6,123,839 A | 9/2000 | Sussman | 210/136 |
| 6,127,671 A | 10/2000 | Parsons et al. | 250/221 |
| 6,155,231 A | 12/2000 | Adachi et al. | 123/399 |
| 6,158,715 A | 12/2000 | Kirschbaum | 251/129.06 |
| 6,161,726 A | 12/2000 | Parsons et al. | 222/52 |
| 6,182,689 B1 | 2/2001 | Lauer et al. | 137/550 |
| 6,198,398 B1 | 3/2001 | Velasquez | 340/604 |
| 6,212,697 B1 | 4/2001 | Parsons et al. | 4/302 |
| 6,216,730 B1 | 4/2001 | Hall | 137/550 |
| 6,227,219 B1 | 5/2001 | Pino | 137/1 |
| 6,250,601 B1 | 6/2001 | Kolar et al. | 251/129.04 |
| 6,260,576 B1 | 7/2001 | Allen | 137/550 |
| 6,273,394 B1 | 8/2001 | Vincent et al. | 251/129.04 |
| 6,293,516 B1 | 9/2001 | Parsons et al. | 251/129.04 |
| 6,298,872 B1 | 10/2001 | Keller | 137/360 |
| 6,299,127 B1 | 10/2001 | Wilson | 251/38 |
| 6,305,662 B1 | 10/2001 | Parsons et al. | 251/129.04 |
| 6,340,032 B1 | 1/2002 | Zosimadis | 137/552 |
| 6,342,295 B1 | 1/2002 | Kobayashi | 428/323 |
| 6,353,942 B1 | 3/2002 | Pondelick et al. | 4/431 |
| 6,367,096 B1 | 4/2002 | Quintana | 4/427 |
| 6,382,586 B1 | 5/2002 | Wilson et al. | 251/40 |
| 6,393,634 B1 | 5/2002 | Kodaira et al. | 4/623 |
| 6,394,412 B2 * | 5/2002 | Zakai et al. | 251/30.02 |
| 6,394,413 B2 * | 5/2002 | Lohde et al. | 251/129.03 |
| 6,401,530 B1 | 6/2002 | Roman | 73/170.21 |
| 6,408,881 B2 | 6/2002 | Lorenzelli et al. | 137/624.11 |
| 6,425,415 B2 | 7/2002 | Lorenzelli et al. | 137/624.11 |
| 6,445,565 B1 | 9/2002 | Toyoda et al. | 361/303 |
| 6,450,478 B2 | 9/2002 | Parsons et al. | 251/129.04 |
| 6,507,200 B2 | 1/2003 | Brandelik et al. | 324/696 |
| 6,532,803 B2 | 3/2003 | Hutchinson et al. | 73/73 |
| 6,609,698 B1 | 8/2003 | Parsons et al. | 251/129.17 |
| 6,619,320 B2 | 9/2003 | Parsons et al. | 137/624.11 |
| 6,619,614 B2 | 9/2003 | Parsons et al. | 251/129.04 |
| 6,643,853 B2 | 11/2003 | Wilson et al. | 4/249 |
| 6,685,158 B2 | 2/2004 | Parsons | 251/30.01 |
| 6,948,697 B2 | 9/2005 | Herbert et al. | 251/129.04 |
| 6,955,334 B2 | 10/2005 | Parsons | 251/129.04 |
| 2005/0189506 A1 * | 9/2005 | Lee | 251/30.01 |

* cited by examiner

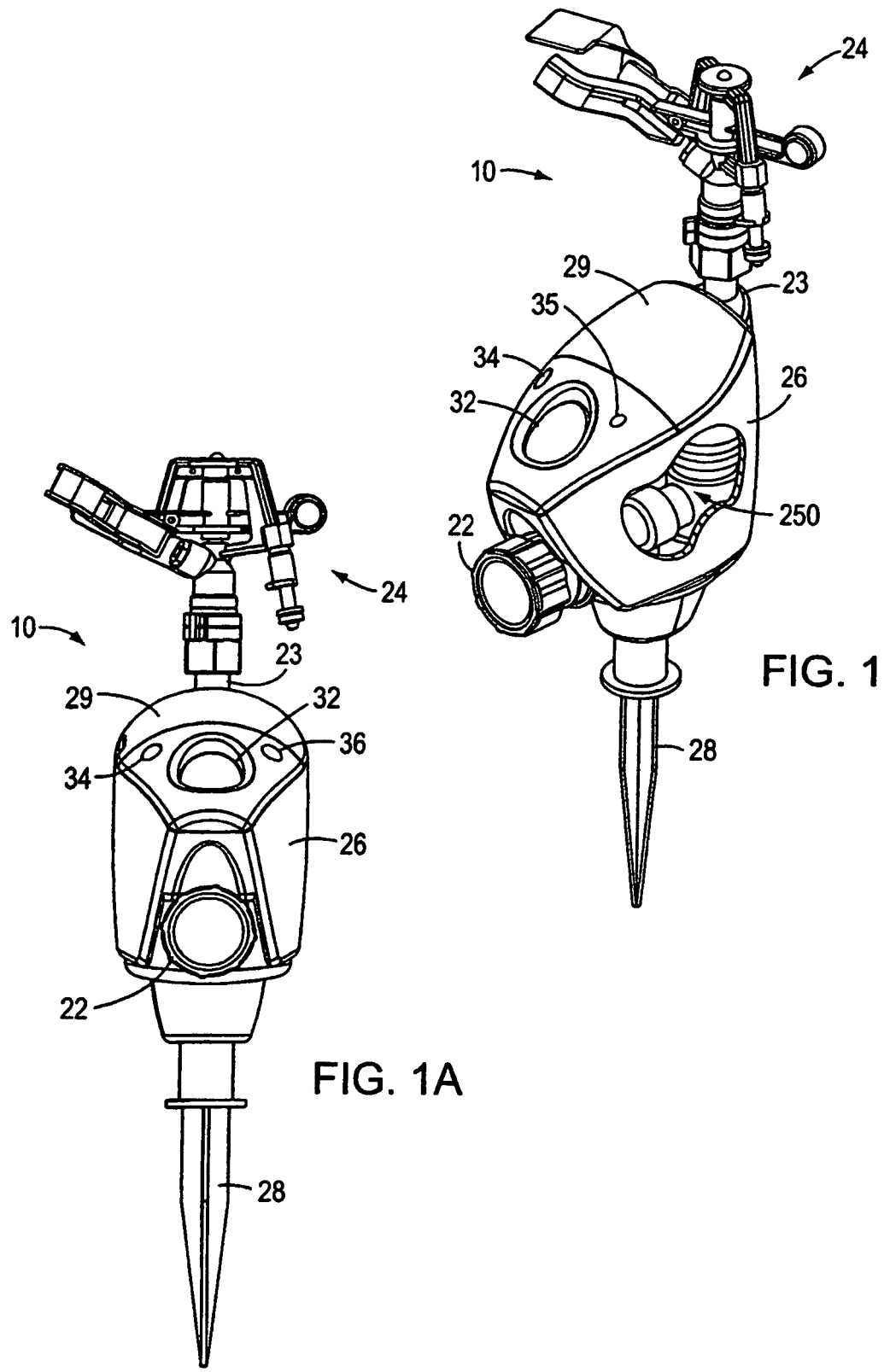

AUTOMATED WATER DELIVERY SYSTEMS WITH FEEDBACK CONTROL

This application is a divisional of a U.S. application Ser. No. 11/022,373 filed on Dec. 22, 2004, which is a continuation of PCT appl. PCT/US2003/020117, filed on Jun. 24, 2003, which claims priority from U.S. Provisional Applications 60/391,282 and 60/391,284 both filed on Jun. 24, 2002, which are incorporated by reference. The PCT/US2003/020117 application is also a continuation-in-part of PCT Applications PCT/US02/38757 and PCT/US02/38758 both filed on Dec. 4, 2002, all of which are incorporated by reference.

BACKGROUND OF THE INVENTION

The present invention relates to automated water delivery systems and methods that enable a local loop feedback control and/or control of a delivered amount of water.

There are various sprinkler devices for watering gardens, yards, or for agricultural uses. These devices may have a controller installed at a source of pressurized water and a remotely located sprinkler. The sprinklers include a rotatable water guide with a water nozzle. When water is ejected from the nozzle, it flows initially through the water guide piece that rotates over a full circle or over a semicircular pattern. The spraying speed is frequently determined by the water flow speed. That is, the water speed governs the rotation of the water guide piece and thus the irrigation pattern.

Many irrigation controllers are time based. The water delivery is activated over a selected period of time regardless of the temperature, air humidity, soil moisture or other vegetation growth factors. Furthermore, the water delivery may vary with the water source pressure and other factors.

Therefore, there is still a need for reliable water delivery systems and control methods capable of delivering selected or known amounts of water. There is still also a need for automated water delivery systems and methods that enable a local loop feedback control and/or can detect local malfunctions.

SUMMARY OF THE INVENTION

The present invention relates to automated water delivery systems and methods with feedback control. The automated systems and methods enable water delivery based on a local loop feedback control and/or control of a delivered amount of water at different water pressures. These systems can be used for watering lawns, gardens, yards, or for agricultural uses.

According to one aspect, a remotely located irrigation system includes a controller connected to receive data from a sensor, and a valve device including an actuator. The system has a water input port constructed to be coupled to a water conduit receiving water from a remotely located water source. The controller is located near the water input port and provides control signals to the actuator. The actuator initiates the on and off states of the valve device located near, and connected to, the water input port for providing water to a water delivery device such as a sprinkler or a drip irrigation device.

According to another aspect, an irrigation system includes a water input port constructed receiving water from a remotely located water source, and a controller located near the water input port and connected to at least one sensor. The system also includes a valve device including an actuator located near and connected to the water input port, wherein the valve device is constructed to receive control signals from the controller for providing water to a sprinkler.

Preferred embodiments may include one or more of the following features: The controller may be battery operated. The actuator is a latching actuator (as described in U.S. Pat. No. 6,293,516, which is incorporated by reference), a non-latching actuator (as described in U.S. Pat. No. 6,305,662, which is incorporated by reference), or an isolated operator (as described in PCT Application PCT/US01/51098, which is incorporated by reference).

The sensor may be a precipitation sensor, humidity sensor, a soil moisture sensor, or a temperature sensor.

The remotely located irrigation system may include an indicator associated with the controller. The remotely located irrigation system may include a wireless communication unit connected to the controller for receiving data or sending data. The remotely located irrigation system may include a manual data input associated with the controller.

The controller may be constructed to provide control signals to at least two actuators, each associated with one valve device and located near and connected to the water input port, wherein the valve device is constructed to receive control signals from the controller for providing water to a water delivery unit.

The controller may be constructed as a time based controller, or as a non-time based controller.

The irrigation system may be constructed to be removably located at a selected location. The irrigation system may be constructed to be mounted on a mobile irrigation platform. The mobile irrigation platform may be self-propelled.

BRIEF DESCRIPTION OF THE DRAWINGS

FIGS. 1 and 1A are perspective views of a stationary water delivery unit.

DESCRIPTION OF THE PREFERRED EMBODIMENTS

Figure 1B:
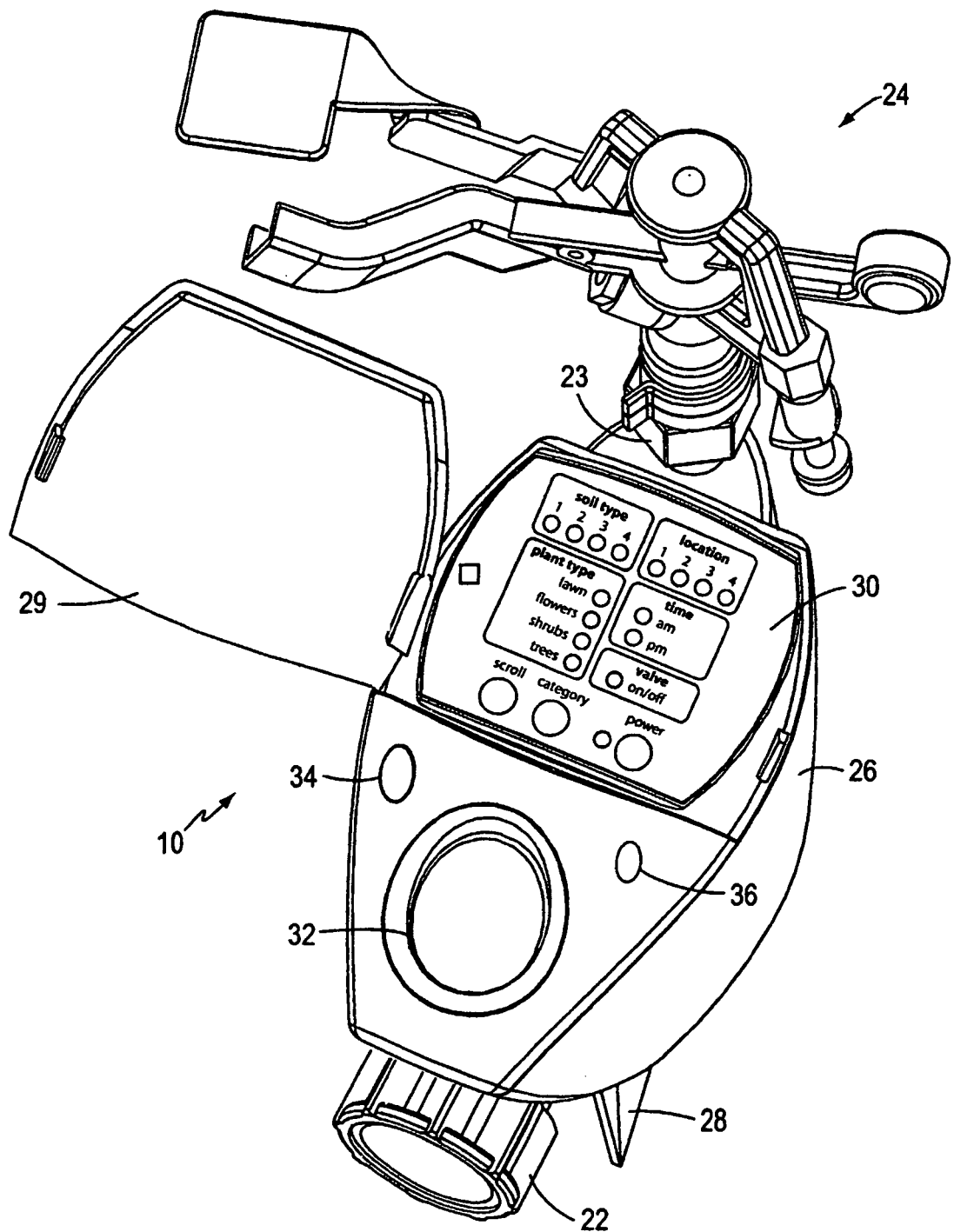
FIG. 1B is a detailed perspective view of the water delivery unit of FIG. 1 also showing various controls located therein.

FIGS. 1, 1A, and 1B show a stationary water delivery unit 10, which includes several sensors and a controller for automated delivery of selected amounts of water depending on the environmental conditions. The water delivery (irrigation) unit 10 includes water input port 22, a sprinkler 24, and an environmentally sealed body 26 supported on a stake 28. The water delivery unit 10 is located remotely from a water source (or a faucet) and is connected to a water hose (or a water pipe) at port 22. The module's body 26 includes a user interface and controls 30 sealably enclosed to be protected from moisture and other elements. The module's body includes one or several ports for various sensors, for example, sensors 64 through 72 described in connection with FIGS. 2 through 5A. For example, module body 26 includes a port 34 with a transparent cover for a light sensor 70 (shown in diagrammatically FIGS. 2 and 7) and a port 36 providing thermally conductive coupling for a temperature sensor 72 (also shown diagrammatically in FIGS. 2 and 7).

Sprinkler 24 is controlled by a control system and an actuator, all described below in connection with FIGS. 10 through 11B. The control system controls the spray pattern of the sprinkler. The sprinkler may be located at a selected height and angle to achieve a desired coverage area, depending on the water pressure and the flow orifices. User interface and controls 30 include various input display and indicator elements described in connection with the embodiment of FIGS. 3 and 3A. Sprinkler 24 may have various embodiments described in U.S. Pat. Nos. 4,580,724; 5,031,835; 5,031,833; 5,238,188; 5,695,122; or 6,164,562 all of which are incorporated by reference.

Water delivery unit 10 is an automated system controlled by a microprocessor that executes various modes of operation. Preferably, the entire water delivery unit 10 is battery operated. Water delivery unit 10 can provide a pre-programmed water delivery without measuring the "local conditions" or by measuring the "local conditions" using one or several sensors. The sensor date may be used to override a pre-selected algorithm (such as skip one watering course after detecting rain). Alternatively, water delivery unit 10 can provide water delivery based on a local loop feedback control by measuring local conditions such as precipitation, humidity, soil moisture, temperature and/or light and using the measured data to deliver a selected amount of water at varying water pressures.

Water delivery unit 10 includes a water pressure sensor (e.g., a sensor system described in connection with FIGS. 11 through 12B), which determines the local water pressure. The local controller includes a memory with stored properties of sprinkler 24 (or another water delivery device such as a drip irrigation system). Based on the orifice size of sprinkler 24 and the control valve, a controller calculates the water delivery time for delivering a desired amount of water over the irrigated area. (This approach differs significantly from the timed water delivery of many prior art systems, where the delivered amount of water varies due to varying water pressure. This approach also differs from many prior art systems, where the water pressure or orifice sizes are not known.)

The present systems and methods are also highly suitable for watering large areas such as parks, golf courses, or agricultural fields using water delivery unit 10, where the "local" conditions vary due to an uneven terrain (e.g., small hills with dry soil or valleys where water has accumulated), and due to different soil, or different vegetation. The present systems and methods are also highly suitable for fields or orchards where different agricultural products are grown. In each case, the local controller receives data from at least one sensor and calculates the desired water amount using stored algorithms. Based on the local water pressure, water delivery unit 10 delivers the calculated water amount over the irrigated area. The design of water delivery unit 10 is also highly suitable for using "gray water" pumped or delivered from canals or water reservoirs. The present design of valves and actuators (described in connection with FIGS. 8 through 10E) doesn't get easily plugged by sand or small particles.

Figure 1C:
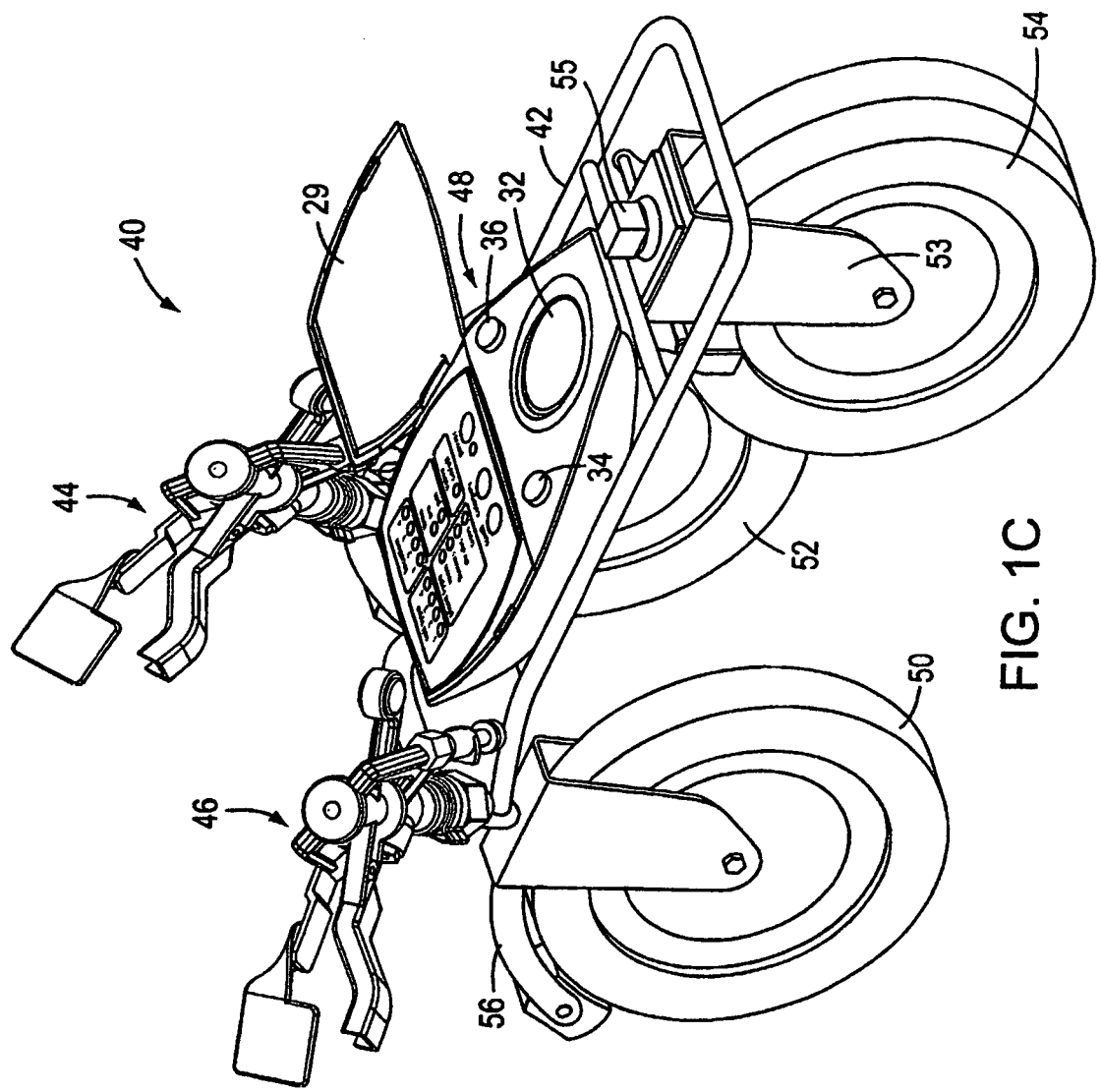
FIG. 1C is a perspective view of a mobile platform for the water delivery unit of FIG. 1.

FIG. 1C illustrates a mobile irrigation platform 40, which operates similarly to water delivery unit 10. Mobile irrigation platform 40 includes a frame 42, one or several sprinklers 44 and 46, and a control unit 48. Sprinklers 44 or 46 may have various embodiments described in U.S. Pat. Nos. 4,580,724; 5,031,835; 5,031,833; 5,238,188; 5,695,122; or 6,164,562 all of which are incorporated by reference.

Mobile irrigation platform 40 also includes two rear wheels 50 and 52, both of which are independently propelled by water pressure from a water supply (not shown in FIG. 1C), and a front wheel 54. The movement of each rear wheel 50 and 52 is actuated by a solenoid valve (or another electromagnetic actuator) located at the input of each wheel so as to control its propulsion. Rear wheels 50 and 52 also include the respective brakes 56 and 58 actuated by water pressure. This arrangement provides the stopping and starting of irrigation platform 40 and enables its left-right rotation by means of shutting off the water supply to any one of wheels 50 or 52, or brakes 56 or 58. The corresponding actuators are controlled by a microcontroller located inside control unit 48. Control unit 48 also includes a local navigation device for directing or monitoring the platform's motion.

To achieve a straight-line motion with both valves to both wheels 50 and 52 open, irrigation platform 40 uses a proportional flow valve arrangement that provides a desired rate of the water supply to the propelled wheels. The proportional flow valve arrangement is placed at a location having equal distance to each wheel so as to insure equal rate of the wheel rotation. Furthermore, each wheel 50 or 52 is mounted onto frame 42 using a spring-loaded independent suspension arrangement (not shown in FIG. 1C). The spring-loaded independent suspension arrangement provides conformance to ground at different heights that may be different for each wheel at times.

Front wheel 54 is spinning free (i.e., is not self-propelling as wheels 50 and 52), but is equipped with two rotation encoders. The first rotation encoder determines the forward or reverse motion. The second rotation encoder is located inside an enclosure 55. The second rotation encoder determines the wheel's clockwise or counter clockwise rotation with respect to frame 42. That is, the second encoder measures the left or right side turns by monitoring the rotational axis of a fork 53, which secures wheel 54 to frame 42. Detailed description of the rotation encoders is provided in U.S. Provisional Application 60/337,112, filed on Dec. 4, 2001, entitled "Cart Management System," published as US 2003/0102969, on Jun. 5, 2003, which is incorporated by reference.

Sprinklers 44 and 46 have their spray nozzles directed at a selected angle (for example, downward with a slight outward angle so as to obtain a spray coverage to the left, right, front and rear of the frame's outline). Each sprinkler 44 or 46 is controlled by the control system and the actuator described below. The control system controls the spray pattern and the water amount. The sprinklers may be located at a selected height or may even be telescopically elevated at actuation to provide a longer trajectory and to enable watering of areas that the platform cannot access. Each sprinkler 44 and 46 may include a solenoid-controlled, proportional flow valve that enables turning on/off of each individual sprinkler (or sprayer) and enables control of the spray distance and trajectory.

Mobile irrigation platform 40 includes a water inlet port (not shown) connectable to a garden hose. The water inlet port enables 360° rotation with respect to the water supply hose with further means of insuring that the platform will not override the hose by virtue of a rotating right angle rigid arm, which will extend and retain the hose beyond the platform traversing path.

Figure 2:
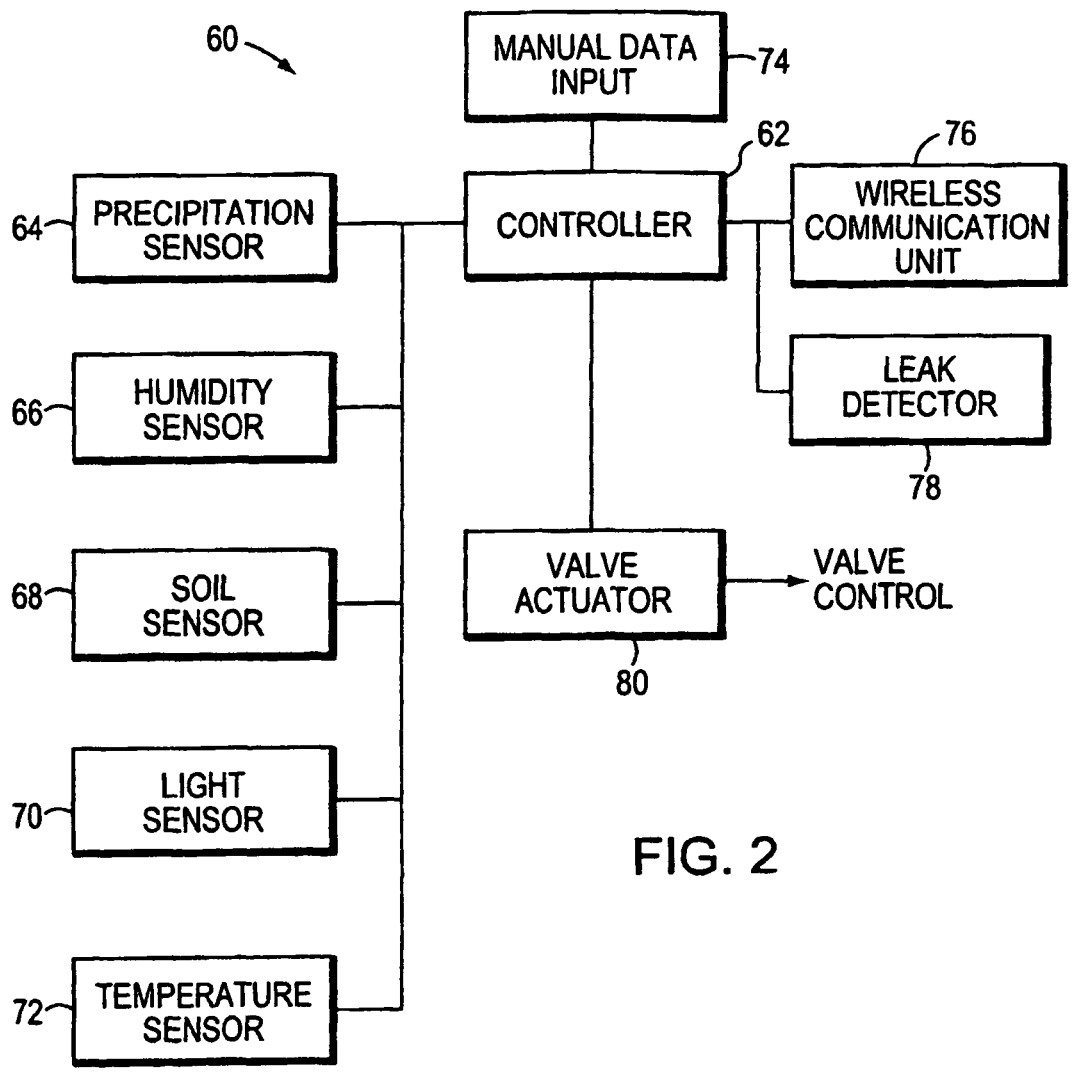
FIG. 2 is a block diagram of a sensor and control system for a single zone of the water delivery unit of FIG. 1.

FIG. 2 shows schematically the control system for a single zone irrigation platform 10. Control system includes a controller 62 for controlling operation of a valve actuator 80 constructed and arranged to control water delivery to at least one sprinkler (or another type of an irrigation device). Different types of valves, sensors, actuators and controllers are described below, all of which are preferably, battery operated. Controller 62 may be connected to one, two or more sensors. For example, controller 62 is connected to a precipitation sensor 64, a humidity sensor 66, a soil moisture sensor 68, a light sensor 70 and a temperature sensor 72. Controller 62 may also be connected to a leak sensor 78 for detecting and indicating a water leak present in the water delivery unit, e.g., at a remote location, or in the ground.

Control system 60 may be connected to other external controllers, sensors, or a central operation unit using standard wires. Alternatively, control system 60 may communicate with other external units using a device described in U.S. patent application Ser. No. 09/596,251, filed on Jun. 16, 2000, and PCT Application PCT/US01/40913, entitled "Method and Apparatus for Combined Conduit/Electrical Conductor Junction Installation," which is incorporated by reference.

Alternatively, control system 60 uses a wireless communication unit 76 for sending data to or receiving data from a central communication unit, for downloading software or input data into the memory of controller 62, or for receiving remote sensor data. Controller 62 may also include one or several displays and a manual data input 74. Depending on a control algorithm and the data received from one or several sensors 64 through 72, controller 62 provides ON and OFF signals to valve actuator 80, which opens or closes water delivery. Preferably, valve actuator 80 actuates a valve device 250 described in connection with FIGS. 8 through 8B. Alternatively, valve actuator 80 may control various other types of valves, such as a diaphragm valve, a piston valve, ball valve, or any other valve known in the field.

Figure 3:
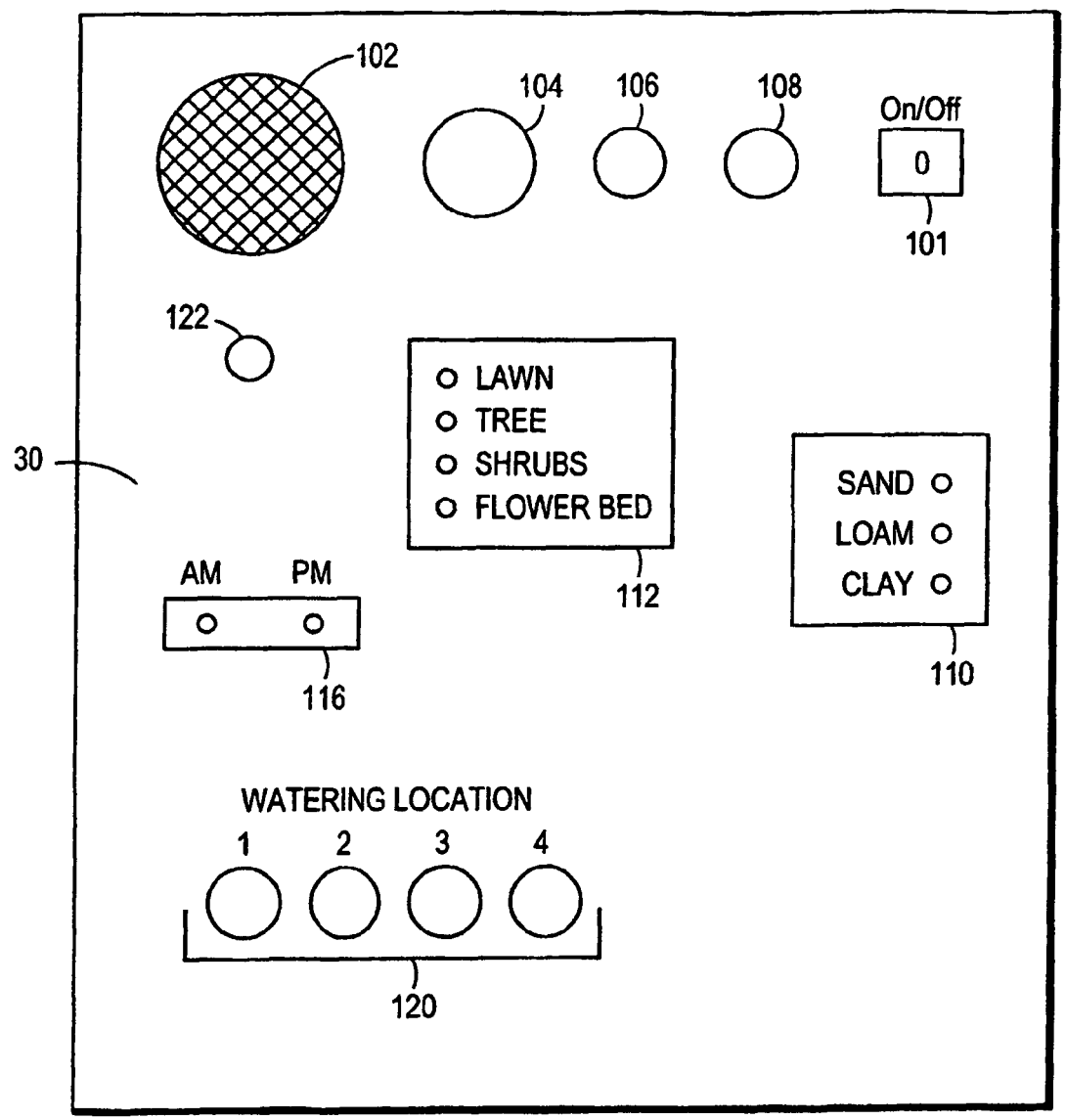
FIGS. 3 and 3A show schematically two embodiments of a control system for the water delivery unit of FIG. 1.
Figure 3A:
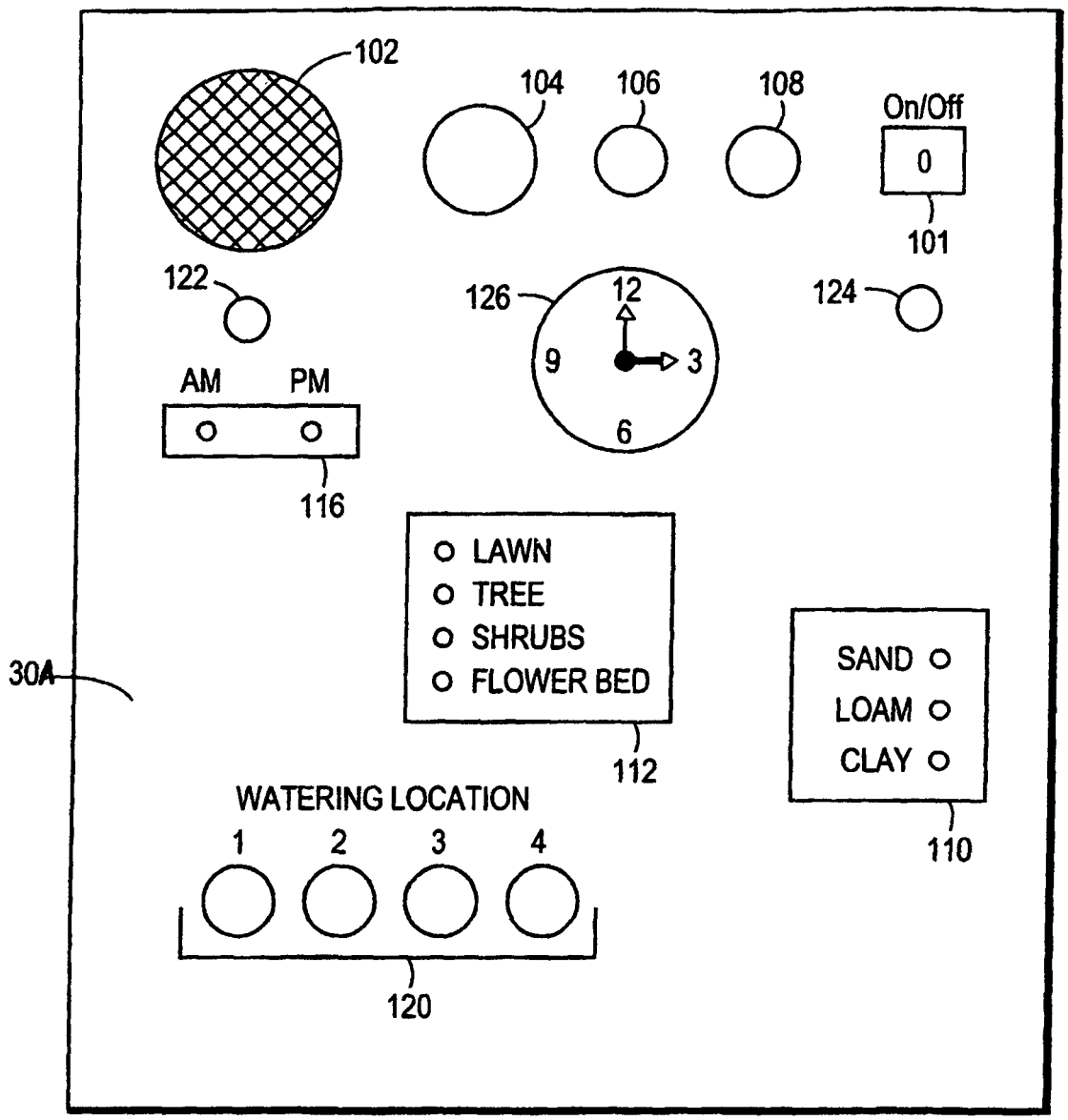

Referring to FIGS. 3 and 3A, stationary water delivery unit 10 or mobile water delivery unit 40 include user interface and controls 30 or user interface 30A. User interface 30 (and 30A) includes several switches, selectors and indicators including a rain sensor indicator 102, a photo sensor indicator 104, a temperature sensor indicator 106, and a humidity sensor indicator 108 (whereas the module's body includes the corresponding rain sensor, the photo sensor, the temperature sensor, and the humidity sensor). User interface unit 30 (or 30A) also includes a soil selector 110, a vegetation-type selector 112, and a daytime (am, pm) selector 116, all of which may also include associated indicators. User interface unit 30 or 30A also includes a watering location indicator 120 and a rain delay indicator 122, which is constructed and arranged to indicate no watering due to precipitation as detected by rain sensor 64.

The entire control and indicator system is packaged in a robust, outdoor sealed container capable of withstanding humid and hot or cold environment and also capable of withstanding mechanical shocks due to rough handling. For example, the photo-sensor is located behind a clear window, and the temperature sensor is located inside a temperature conductive conduit protecting the temperature sensor and providing good thermal coupling. Rain sensor 64 includes opening 32 covered by a removable screen and wire mesh, as described below in connection with FIG. 4. Watering time selector 116 includes two switches constructed and arranged to select daylight or night watering time and their frequency. For example, a user can select two nighttime waterings, the first one several hours after sunset and the second one half an hour before sunrise. Each switch includes a built in visible indicator constructed and arranged to indicate the selected watering schedule.

Still referring to FIGS. 3 and 3A, soil selector 110 includes, for example, three switches constructed and arranged for a user to select the type of soil to be irrigated. Based on the type of soil, the microcontroller automatically adjusts the watering schedule and volume optimal for the selected type of soil and vegetation based on the vegetation type selected by selector 112. Both soil selector 110 and vegetation-type selector 112 may include visible indicators such as a light emitting diode (LED). User interface 30 or 30A also includes a power switch 101 and may include an RF communication module (module 76 shown in FIG. 2 or 7) constructed and arranged to receive commands related to various watering cycles.

The rain sensor detects the amount of natural precipitation and provides the corresponding signal to the microcontroller. The microcontroller may delay a watering cycle based on the amount of precipitation. The late watering cycle is displayed to a user by rain delay indicator 122. Rain delay indicator 122 includes a single color visible LED, or another indicating element. A user can manually select the vegetation type using vegetation type selector 112. The selected type of vegetation is then indicated by one of four single color visible LEDs. (Alternatively, a single multi-color or two dual color light indicators may be used.)

For example, in the embodiment where remote location control unit 30 is constructed and arranged as a hose-end controller (as shown in FIGS. 1, 1A and 1B), a user will physically move the hose-end controller, including the hose connected to a water source, to another location. Watering location indicator 120 indicates the location so that this location and prior locations will be communicated to another user (or the same user without needing to remember the locations). The selected locations may be changed, for example, once a day so that a parcel of land is watered once every three or four days depending on a selected algorithm.

FIG. 3A schematically illustrates another embodiment of the remote location control unit, that is, remote location control unit 30A. Remote location control unit 30A includes rain sensor 102, photo sensor 104, temperature sensor 106, humidity sensor 108, watering location indicator 120, soil selector 110, and vegetation type selector 112. Remote location control unit 30A also includes a clock 126, with an associated clock-adjust knob, and an associated AM-PM selector 116. The selected time may be stored in the memory of controller 62.

Figure 4:
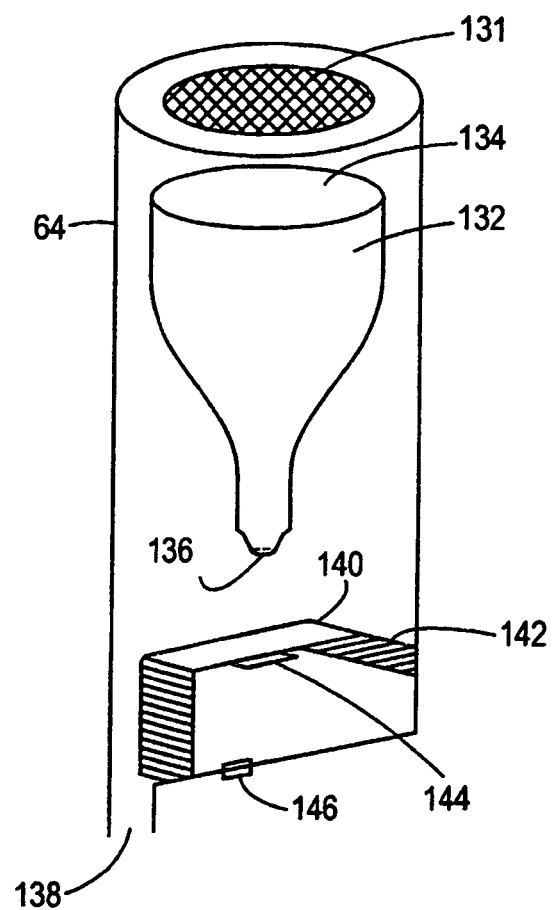
FIG. 4 shows schematically a precipitation sensor that can be used in the water delivery unit of FIG. 1.

FIG. 4 shows schematically a rain sensor (or precipitation sensor) 64. The rain sensor includes an input port 32, a funnel-shaped member 132, and a detector 140. The input port 32 includes a coarse convex inlet screen and a fine concave inlet screen 131 for eliminating solid contaminants and transmitting only water. Funnel-shaped member 132 includes a funnel inlet 134 and a funnel drain port 136 having a size that ensures that accumulated water will exit in forms of droplets. Detector 140 includes piezo-electric sensor 144 and electric-electric element 146. Piezo-electric disk 144 is positioned at an optimal location using positioning elements 142. Piezo-electric sensor 144 includes a sealed junction with electrical conduits exiting from the main body via one or several conduits. The droplet sensor 140 detects the size and frequency of the individual droplets exiting funnel drain port 136. The size and frequency of the droplets depends on the amount of water accumulated inside funnel-shaped member 132.

Figure 5A:
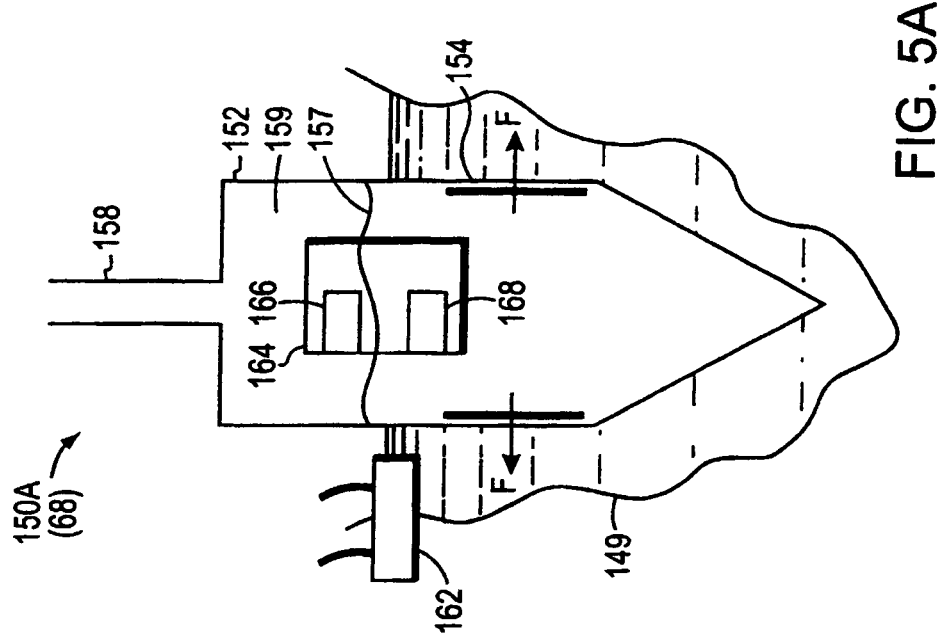
FIGS. 5 and 5A show schematically two embodiments of a soil humidity sensor that can be used in the water delivery unit of FIG. 1.
Figure 5:
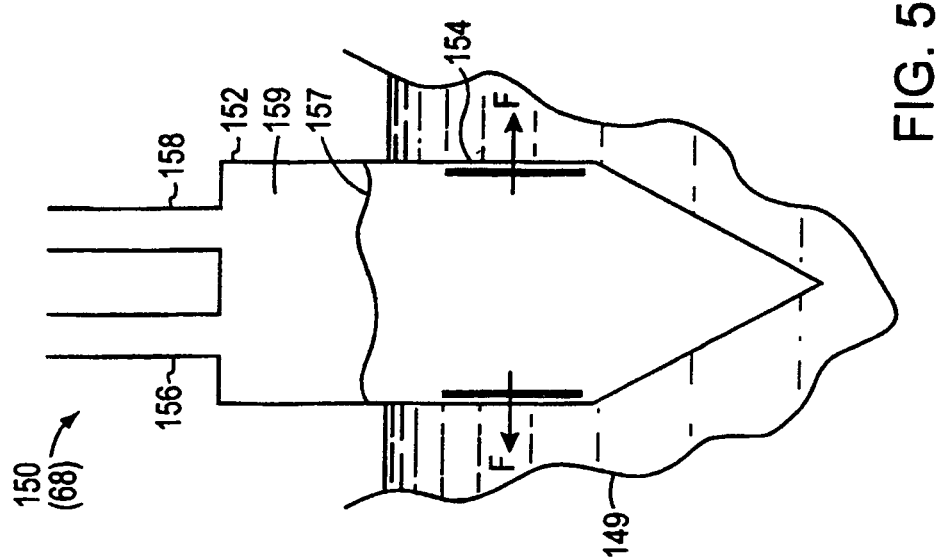

FIG. 5 shows schematically a ground moisture sensor or a soil moisture sensor 150. Soil moisture sensor 150 (i.e., soil moisture sensor 68) includes a rigid containment chamber 152 with a semi-permeable membrane 154 and two ports 156 and 158. Refill port 158 is used to deliver liquid inside rigid containment member 152, and pressure measurement port 156 is used to measure pressure above liquid level in cavity 159 inside rigid containment chamber 152. Soil moisture sensor is inserted into soil 149 so that semi-permeable membrane 154 is completely inserted inside the soil. Membrane 154 allows migration of water molecules from containment chamber 152 to the soil, wherein the migration rate depends on the hygroscopic force (F) between the soil and the liquid inside containment chamber 152. The hygroscopic force, of course, depends on the moisture content inside soil 149. Due to the water migration, there is a reduced pressure in region 156, which pressure is detected by a pressure sensor located inside body 26 (and indicated by user interface 30). The ground moisture sensor of FIG. 5 is relatively independent of the type of the soil because the hygroscopic force is predominantly related to the moisture content of the soil and the type of the soil plays a very small part in the algorithm. Therefore, the ground moisture sensor does not need to be calibrated each time when inserted inside soil 149.

FIG. 5A shows schematically another embodiment of the ground moisture sensor 150A (i.e., soil moisture sensor 68). Soil moisture sensor 150A includes a rigid containment chamber 152, a semi-permeable membrane 154 and a liquid fill port 158. Inside rigid containment chamber 152 there is a float 164 including two magnets 166 and 168 (generally, one or several magnets may be used). Float 164 is cooperatively arranged with a reed sensor 162 located on the external surface of, or associated with, rigid containment chamber 152.

The ground moisture sensor is filled with liquid through liquid refill port 158. Float 164 is located near or at the liquid surface, depending on its construction. Due to the hygroscopic force (F) directed from inside of rigid containment chamber 152 toward soil 149, water migrates from inside of chamber 152. As the liquid seeps out through semi-permeable membrane 154, water level drops which changes the location (the relative height) of float 164. Reed sensor 162 detects location of magnets 166 or 168 and provides a signal to the microcontroller regarding the water level inside rigid containment chamber 152. Based on this electrical signal the ground moisture content is determined using a calibration curve. Thus the microcontroller receives information about the ground moisture from the ground moisture sensor 150 or 150A. There may be several ground moisture sensors located around the water territory and these may be hard-wired to the microcontroller or may provide information using RF or other wireless coupling.

Another embodiment of soil moisture sensor 68 includes two electrodes located on a stake and insertable in the ground. The two electrodes are separated by a predetermined distance. The resistance or ion migration between the two electrodes varies depending on the ground moisture. The electrodes may be made of metals providing a different potential and thus causing migration of ions there between. A measurement circuit connected to the two electrodes measures the corresponding potential. Alternatively, the two electrodes may be made of an identical, non-corrosive metal (e.g., stainless steel 300 series) connected to an electrical circuit. The electrical circuit provides a two-point or a four-point measurement of electrical conductivity between the electrodes, which conductivity corresponds to the soil moisture. The measured conductivity data is provided to a microcontroller 62, which then determines the moisture content of the soil and determines the irrigation cycle according to a selected algorithm. Alternatively, at least one of the electrodes may include conductive and isolating regions located at different depths in the ground. Based on the conductivity value measured at different levels, the moisture sensor measures the moisture profile at different depths in the ground. Again, microcontroller 62 uses the depth moisture profile for calculating an appropriate irrigation cycle.

Alternatively, the ground moisture sensor may be a capacitive sensor having a porous dielectric. The dielectric material is in contact with the ground and water migrates between the capacitive plates by the capillary effect from the ground. Depending on the ground moisture, the dielectric constant of the capacitor varies. Thus, the capacitance value corresponds to measured moisture content of the ground.

Figure 6:
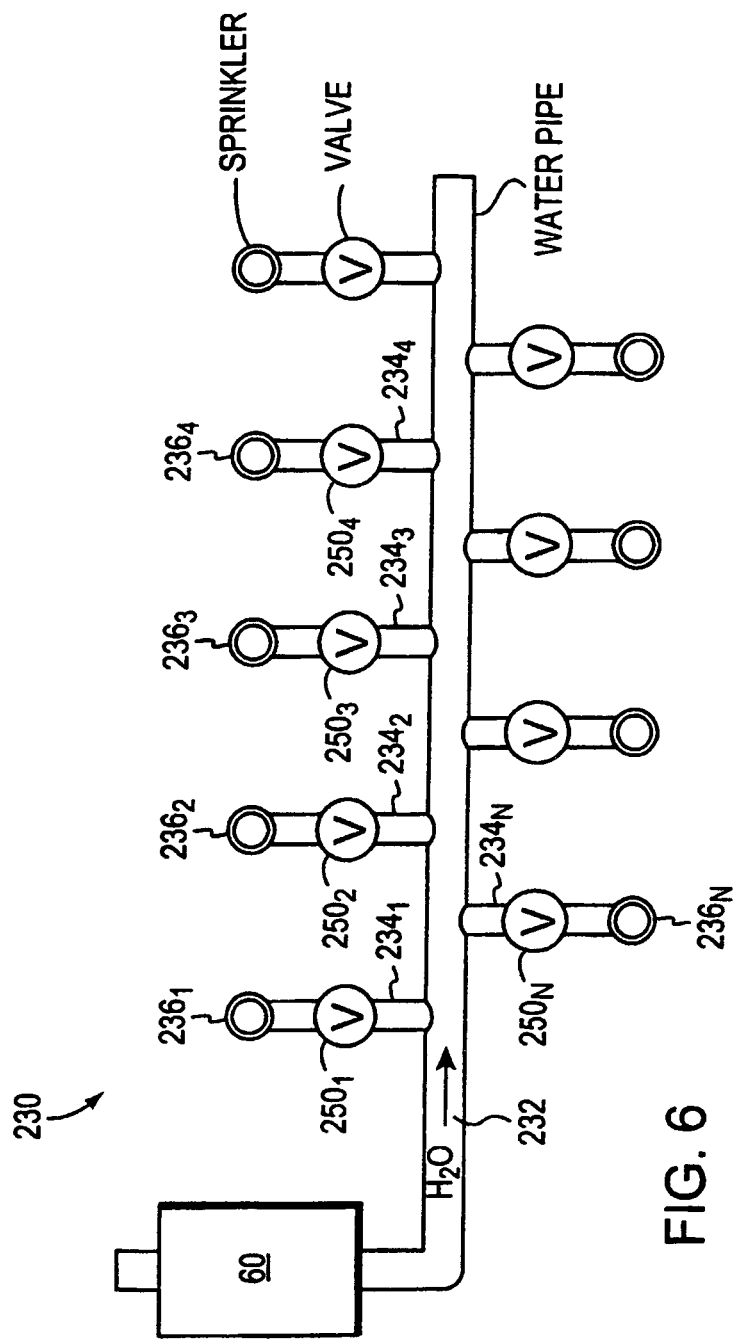
FIG. 6 shows schematically a multizone, in ground water delivery unit including a multiplicity of local valves and sprinkler units.
Figure 6A:
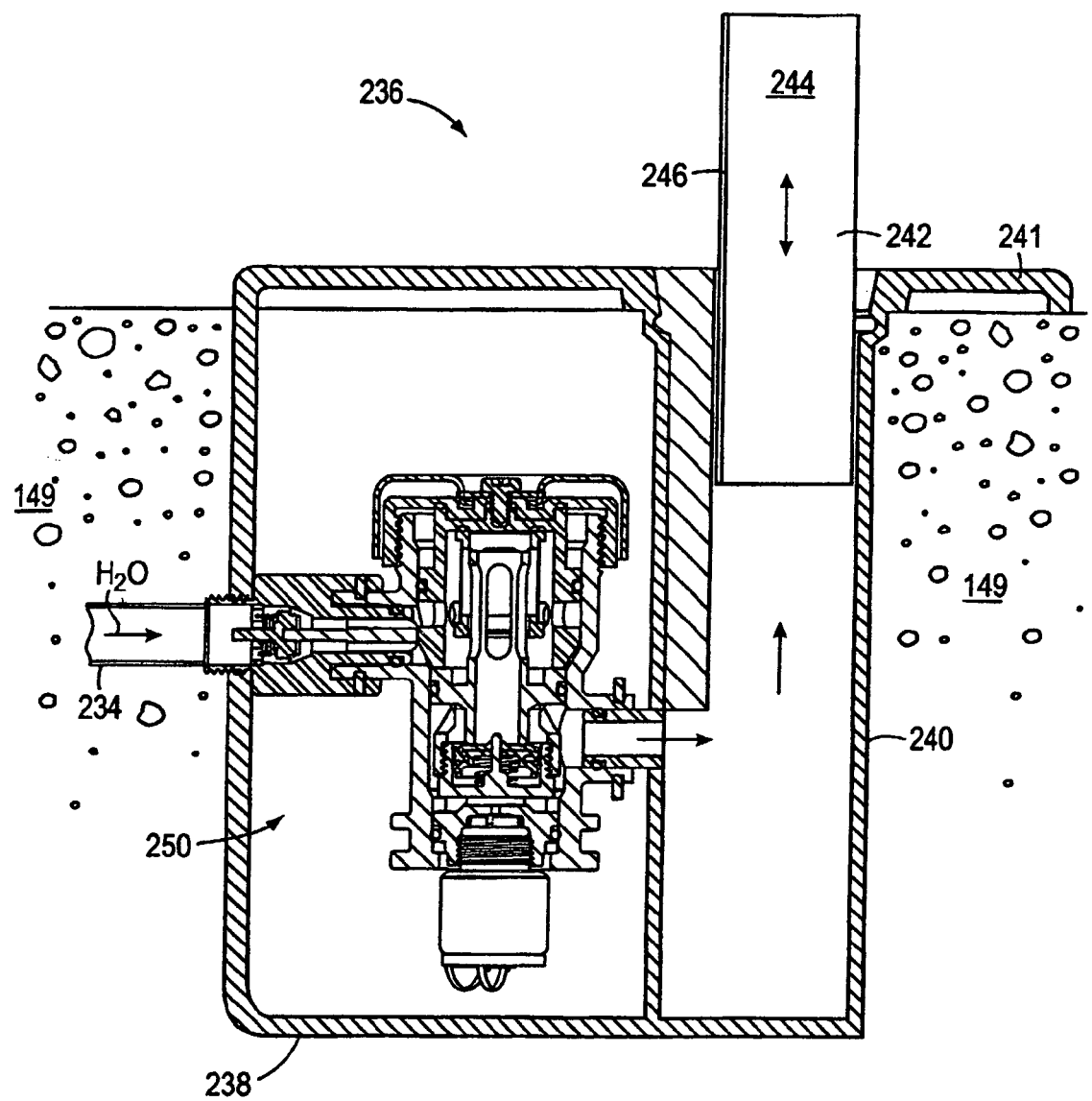
FIG. 6A shows schematically a single water delivery unit and an associated valve assembly for the multizone water delivery unit of FIG. 6.

FIG. 6 shows schematically a multizone in ground water delivery unit 230. Water delivery unit 230 includes a control module with control system 60A and a plurality of water pipes 232 and 234 for delivering water to a number of valves 250 and a number of in ground sprinklers 236, shown in FIG. 6A. Control system 60A is shown in detail in FIG. 7. A sprinkler system 236 includes a sealed enclosure 238 for housing a valve 250 and optionally control system 60. Coupled to enclosure 238 is a housing 240 and a protective cover 241, all of which are located in ground 149. Housing 240 includes a pop-up element 242 having a water delivery port (or a sprinkler) located generally at a distal end 244. Pop-up element 242 also includes a vertical antenna 246 coupled to wireless communication unit 76 (FIG. 2) for wireless communication. The present design may be used with various embodiments of in ground pop-up (riser) sprinklers described in U.S. Pat. Nos. 4,781,327; 4,913,351; 5,611,488; 6,050,502; 5,711,486; and US Patent Publications 2001/0032890; 2002/0092924; 2002/0153432, all of which are incorporated by reference According to another embodiment, each valve 250 and the associated sprinkler 236 may include one control system 60 (which in this embodiment is a local control system) located inside enclosure 238 and communicating with a central control or interface system via antenna 246. Local control system 60 (shown in FIG. 2) may also be connected to leak detector 78 for detecting water leak at valve 250. Wireless communication unit 76 may include a transmitter and a receiver, or just a receiver. At a preselected time, pop-up element 242 rises above ground 149 (by water pressure delivered from valve 250) and antenna 246 is used to establish wireless communication. Advantageously, most of the time, antenna 246 is retracted below ground thus eliminating any obstructions to people or machinery.

Figure 7:
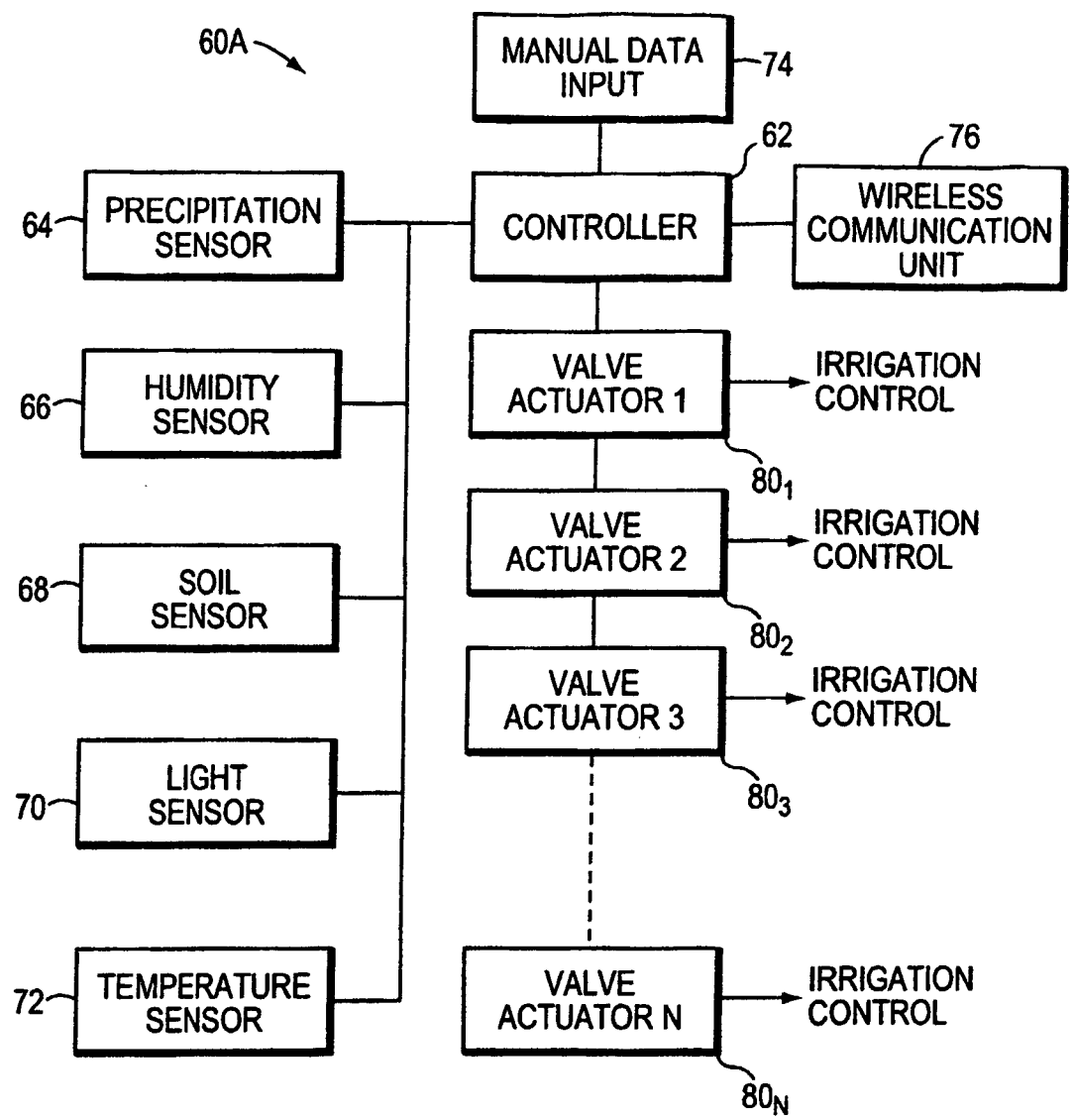
FIG. 7 is a block diagram of a sensor and control system for a multi-zone water delivery unit.

FIG. 7 illustrates diagrammatically a multi-zone irrigation control system 60A. Irrigation control system 60A includes controller 62 receiving data from one or several sensors 64 through 72, described above. Controller 62 provides drive ON or OFF signals to valve actuators $80_1, 80_2, 80_3 \ldots 80_N$. Valve actuators $80_1, 80_2, 80_3 \ldots 80_N$ actuate individual valve devices that in turn provide water to separate sprinklers (or any other irrigation units). Again, controller 62 may have an associated wireless communication unit 76 for sending data to, or receiving data from, a central communication unit, a remote sensor, or any other device.

Figure 8:
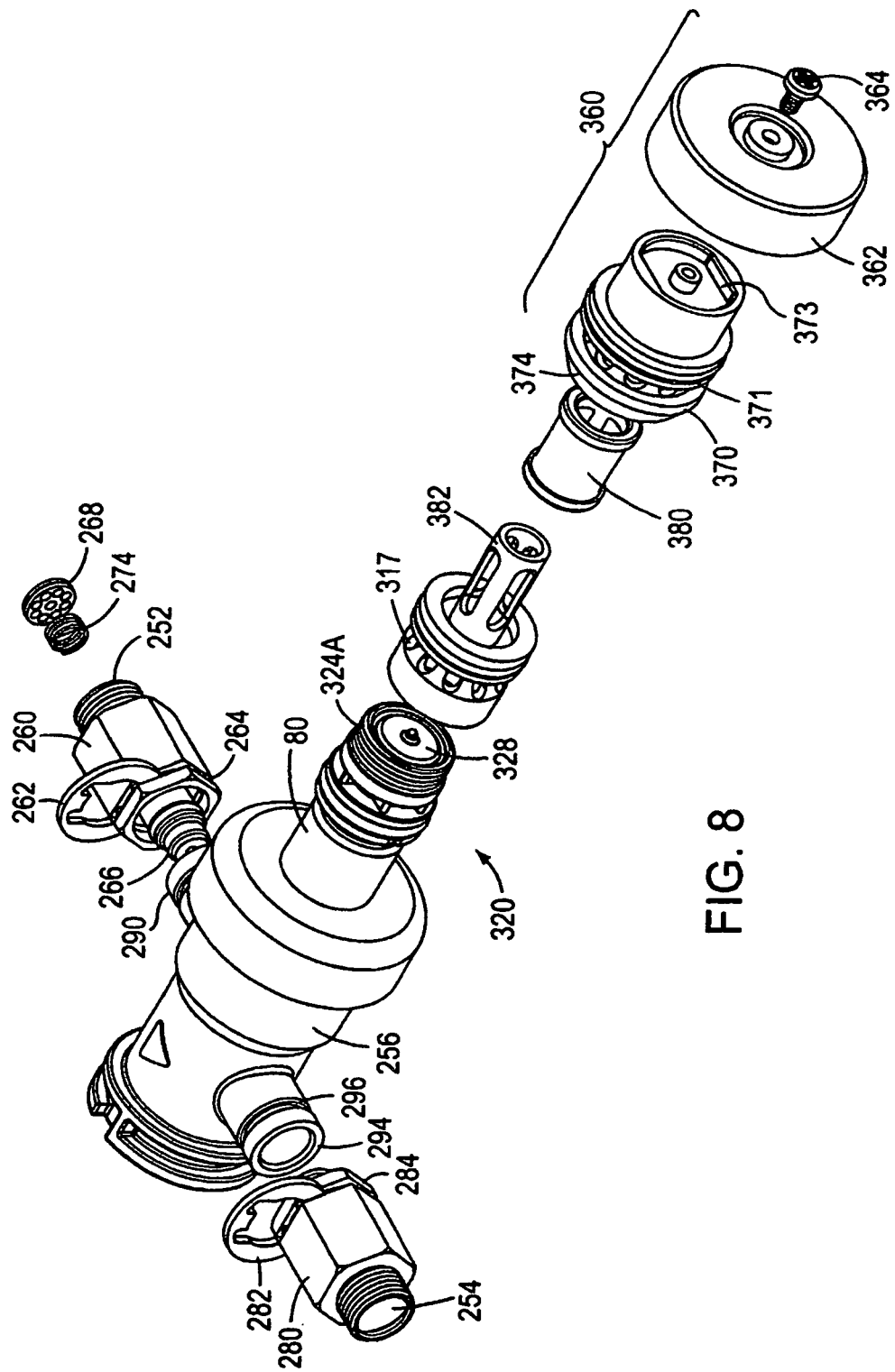
FIG. 8 is a perspective exploded view of a valve device used in the water delivery unit of FIG. 1.
Figure 8A:
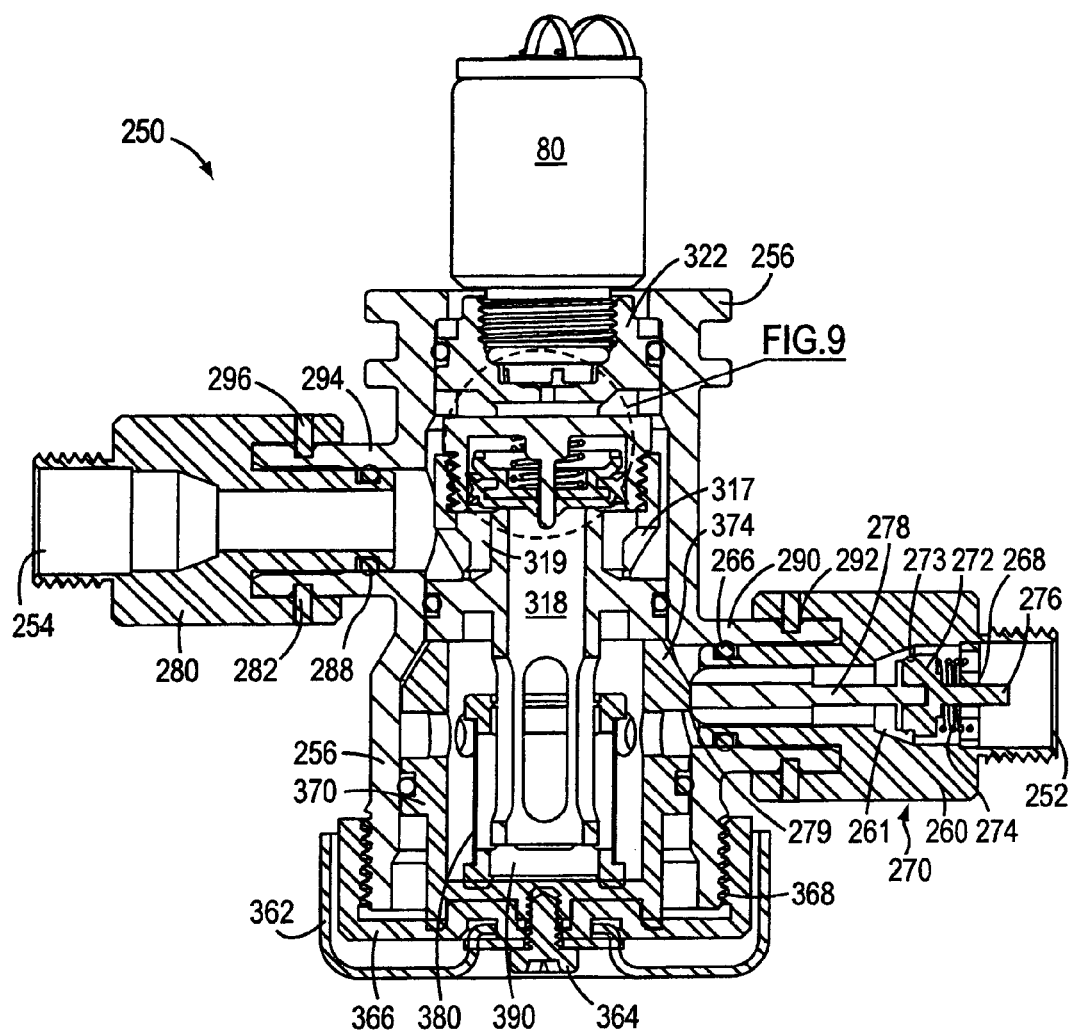
FIG. 8A is an enlarged crossectional view of the valve device shown in FIG. 8.
Figure 8B:
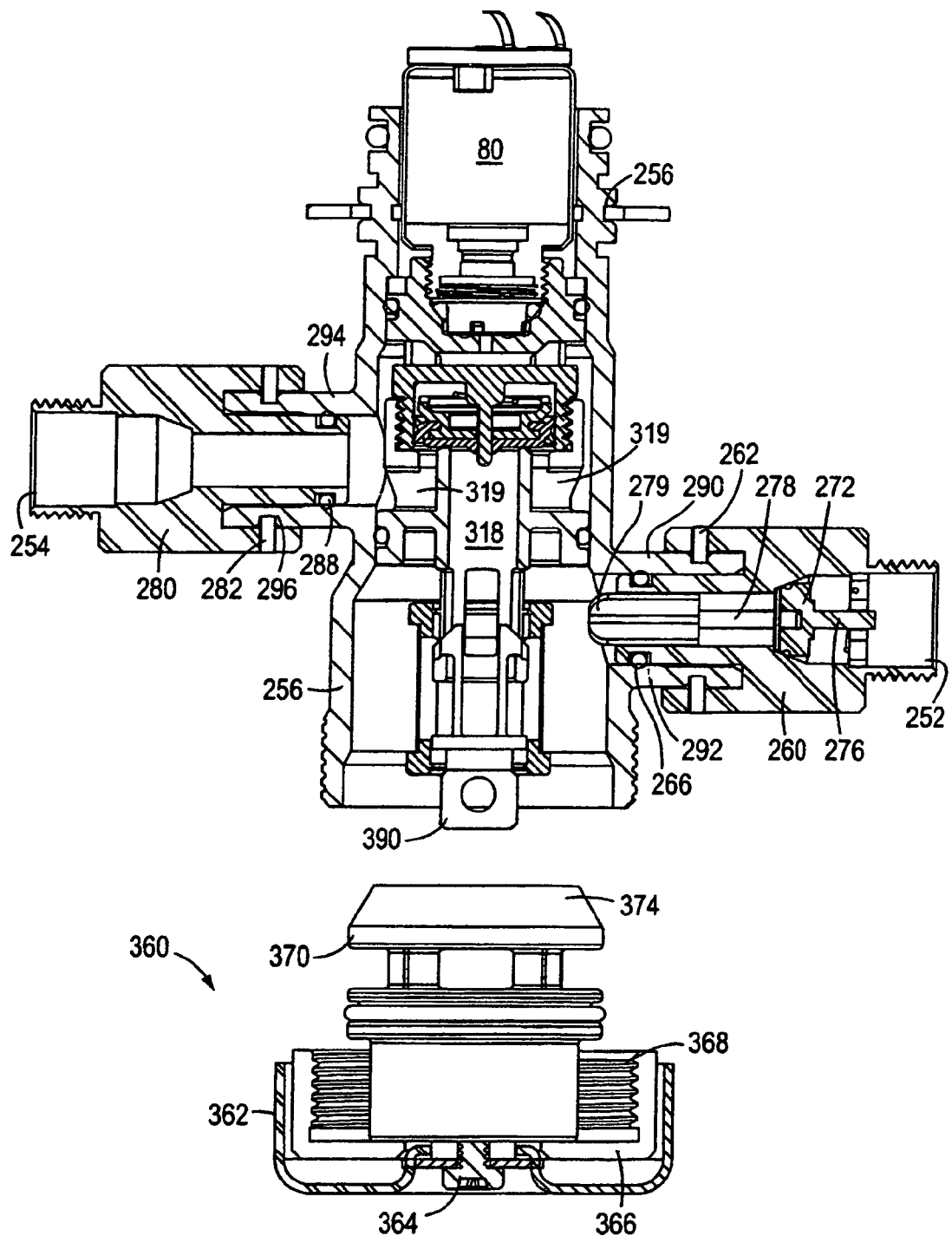
FIG. 8B is an enlarged crossectional view of the valve device shown in FIG. 8A, but partially disassembled for servicing.

FIGS. 8, 8A and 8B illustrate an automatic valve device 250 constructed and arranged for controlling water flow in water delivery unit 10 or 40. Specifically, automatic valve device 250 receives water at a valve input port 252 and provides water from a valve output port 254, in the open state. Automatic valve device 250 includes a body 256 made of a durable plastic or metal. Preferably, valve body 256 is made of a plastic material but includes a metallic input coupler 260 and a metallic output coupler 280. Input and output couplers 260 and 280 are made of metal (such as brass, copper or steel) so that they can provide gripping surfaces for a wrench used to connect them to a water line inside water delivery unit 10 (or in ground unit 236). Valve body 256 includes a valve input port 290, and a valve output port 294.

Metallic input coupler 260 is rotatably attached to input port 290 using a C-clamp 262 that slides into a slit 264 inside input coupler 260 and also a slit 292 inside the body of input port 290. Metallic output coupler 280 is rotatably attached to output port 294 using a C-clamp 282 that slides into a slit 284 inside output coupler 280 and also a slit 296 inside the body of output port 294. When servicing delivery unit 10 (or in ground unit 236), this rotatable arrangement prevents tightening the water line connection to any of the two valve couplers unless attaching the wrench to the surface of couplers 260 and 280. (That is, a service person cannot tighten the water input and output lines by gripping on the valve body 256.) This protects the relatively softer plastic body 256 of automatic valve device 250. However, body 256 can be made of a metal in which case the above-described rotatable coupling is not needed. A sealing O-ring 266 seals input coupler 260 to input port 290, and a sealing O-ring 288 seals output coupler 280 to input port 294.

Referring to FIGS. 8, 8A, and 8B, metallic input coupler 260 includes an inlet flow adjuster 270 cooperatively arranged with a flow control mechanism 360. Inlet flow adjuster 270 includes an adjuster piston 272, a closing spring 274 arranged around an adjuster pin 276 and pressing against a pin retainer 268. Inlet flow adjuster 270 also includes an adjuster rod 278 coupled to and displacing adjuster piston 272. Flow control mechanism 360 includes a spin cap 362 coupled by screw 364 to an adjustment cap 366 in communication with a flow control cam 370. Flow control cam 370 slides linearly inside body 256 upon turning adjustment cap 366. Flow control cam 370 includes inlet flow openings 371, a locking mechanism 373 and a chamfered surface 374. Chamfered surface 374 is cooperatively arranged with a distal end 279 of adjuster rod 278. The linear movement of flow control cam 370, within valve body 256, displaces chamfered surface 374 and thus displaces adjuster rod 278. Adjuster piston 272 also includes an inner surface 273 cooperatively arranged with an inlet seat 261 of input coupler 260. The linear movement of adjuster rod 278 displaces adjuster piston 272 between a closed position and an open position. In the closed position, sealing surface 273 seals inner seat 261 by the force of closing spring 274. In the opened position, adjuster rod 278 displaces adjuster piston 272 against closing spring 274 thereby providing a selectively sized opening between inlet seat 261 and sealing surface 273. Thus, by turning adjustment cap 366, adjuster rod 278 opens and closes inlet adjuster 270. Inlet adjuster 270 controls the water input flow to sprinkler 24. The above-described manual adjustment can be replaced by an automatic motorized adjustment mechanism controlled by microcontroller 62.

Referring still to FIGS. 8, 8A and 8B, automatic valve device 250 also includes a removable inlet filter 380 removably located over an inlet filter holder 382, which is part of the lower valve housing. Inlet filter holder 382 also includes an O-ring and a set of outlet holes 317 shown in FIG. 9. The "fram piston" 326 is shown in detail in FIG. 9A. Water flows from input port 252 of input coupler 260 through inlet flow adjuster 270 and then through inlet flow openings 371, and through inlet filter 380 inside inlet filter holder 382. Water then arrives at an input chamber 318 inside a cylindrical input element 324 (FIG. 9) providing pressure against a pliable member 328.

Automatic valve device 250 also includes a service loop 390 (or a service rod) designed to pull the entire valve assembly, including attached actuator 80, out of body 256, after removing of plug 366. The removal of the entire valve assembly also removes the attached actuator 80 and piloting button 705 (shown in FIG. 10). To enable easy installation and servicing, there are rotational electrical contacts located on a PCB at the distal end of actuator 80. Specifically, actuator 80 includes, on its distal end, two annular contact regions that provide a contact surface for the corresponding pins, all of which can be gold plated for achieving high quality contacts. Alternatively, a stationary PCB can include the two annular contact regions and the actuator may be connected to movable contact pins. Such distal, actuator contact assembly achieves easy rotational contacts by just sliding actuator 80 located inside valve body 256.

Figure 8C:
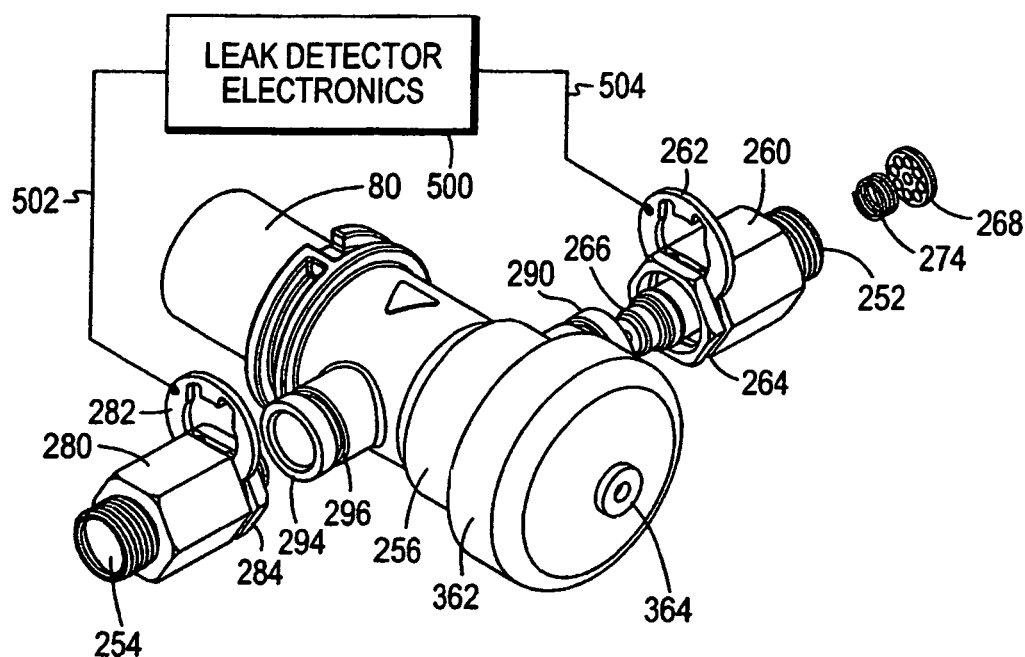
FIG. 8C is a perspective view of the valve device of FIG. 1 including a leak detector.

FIG. 8C illustrates automatic valve device 250 including leak detector 78 for indicating a water leak or water flow across valve device 250. Leak sensor 78 includes electronic measurement circuit 500 and at least two electrodes 502 and 504 coupled respectively to input coupler 260 and output coupler 280. (The leak sensor may also include four electrodes for a four-point resistivity measurement). Valve body 256 is made of plastic or another non-conductive material. In the closed state, when there is no water flow between input coupler 260 and output coupler 280, electronic circuit 500 measures a very high resistance value between the two electrodes. In the open state, the resistance value between input coupler 260 and output coupler 280 drops dramatically because the flowing water provides a conductive path.

There are various embodiments of electronics 500, which can provide a DC measurement, an AC measurement including eliminating noise using a lock-in amplifier (as known in the art). Alternatively, electronics 500 may include a bridge or another measurement circuit for a precise measurement of the resistivity. Electronic circuit 500 provides the resistivity value to microcontroller 62 and thus indicates when valve device 250 is in the open state. Furthermore, leak sensor 78 indicates when there is an undesired water leak between input coupler 260 and output coupler 280. The entire valve 250 is located in an isolating enclosure (e.g., enclosure 26 in FIG. 1, or enclosure 238 in FIG. 6A) to prevent any undesired ground paths that would affect the conductivity measurement. Furthermore, leak sensor 78 can indicate some other valve failures when water leaks into enclosure 26 or 238 from valve device 250. Thus, leak detector 78 can sense undesired water leaks that would be otherwise difficult to observe. Leak detector 78 is constructed to detect the open state of the irrigation system to confirm proper operation at a remote location.

Figure 9:
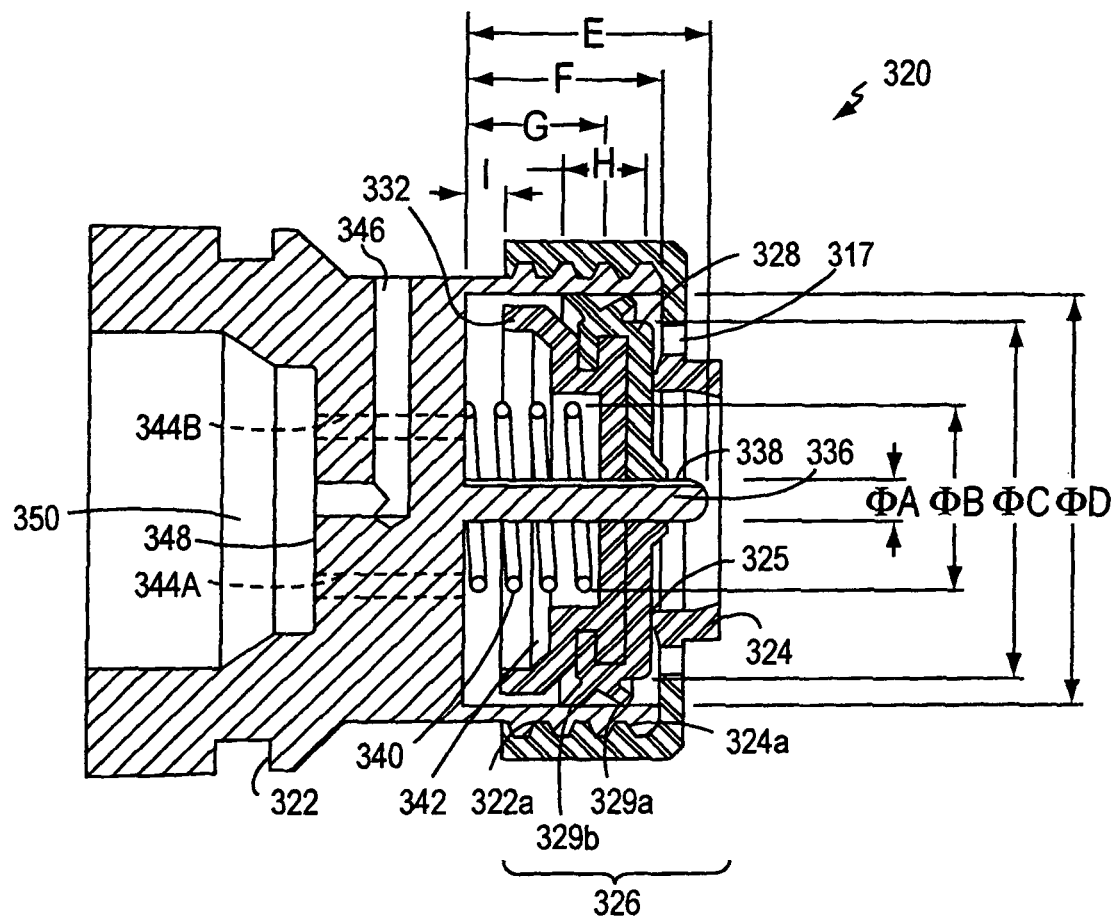
FIG. 9 is an enlarged crossectional view of a moving piston-like member used in the valve device shown in FIGS. 8, 8A, and 8B.

Automatic valve device 250 may include a standard diaphragm valve, a standard piston valve, or a novel "fram piston" valve 320 explained in detail in connection with FIGS. 9, 9A, and 9B. Referring to FIG. 9, valve 320 includes distal body 324, which includes an annular lip seal 325 arranged, together with pliable member 328 (FIG. 9A), to provide a seal between input port chamber 318 and output port chamber 319. Distal body 324 also includes one or several flow channels 317 (also shown in FIG. 8) providing communication (in the open state) between input chamber 318 and output chamber 319. Pliable member 328 also includes sealing members 329A and 329B arranged to provide a sliding seal, with respect to valve body 322, between pilot chamber 342 and output chamber 319. There are various possible embodiments of seals 329a and 329b (FIG. 9). This seal may be a one-sided seal or two-sided seal 329A and 329B shown in FIG. 9. Furthermore, there are various additional embodiments of the sliding seal including O-rings, etc.

The present invention envisions valve device 320 having various sizes. For example, the "full" size embodiment has the pin diameter A=0.070", the spring diameter B=0.360", the pliable member diameter C=0.730", the overall fram and seal's diameter D=0.812", the pin length E=0.450", the body height F=0.380", the pilot chamber height G=0.280", the fram member size H=0.160", and the fram excursion I=0.100". The overall height of the valve is about 1.39" and diameter is about 1.178".

The "half size" embodiment of the "fram piston" valve has the following dimensions provided with the same reference letters. In the "half size" valve A=0.070", B=0.30, C=0.560", D=0.650", E=0.38", F=0.310", G=0.215", H=0.125", and I=0.60". The overall length of the ½ embodiment is about 1.350" and the diameter is about 0.855". Different embodiments of the "fram piston" valve device may have various larger or smaller sizes.

Figure 9A:
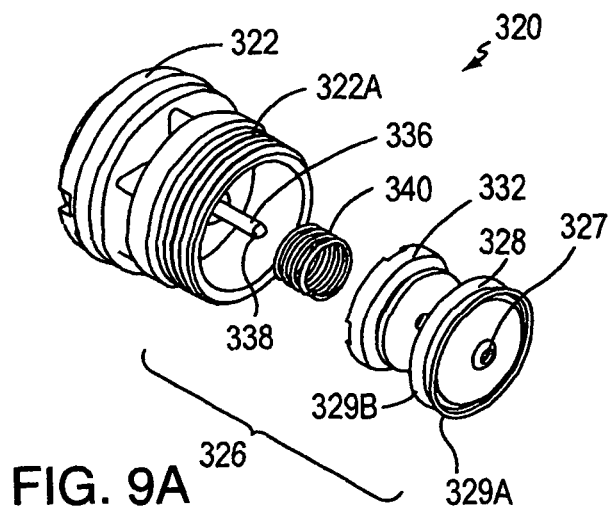
FIG. 9A is a detailed perspective view of the moving piston-like member shown in FIG. 9.

Referring to FIGS. 9 and 9A, the fram piston valve 320 receives fluid at input port 318, which exerts pressure onto diaphragm-like member 328 providing a seal together with a lip member 325 in a closed state. Groove passage 338 provides pressure communication with pilot chamber 342, which is in communication with actuator cavity 350 via communication passages 344A and 344B. An actuator (shown in FIG. 10, 10A or 10B) provides a seal at surface 348 thereby sealing passages 344A and 344B and thus pilot chamber 342. When the plunger of actuator 80 or 81 moves away from surface 348, fluid flows via passages 344A and 344B to control passage 346 and to output chamber 319. This causes pressure reduction in pilot chamber 342. Therefore, diaphragm-like member 328 and piston-like member 332 move linearly within cavity 342, thereby providing a relatively large fluid opening at lip seal 325. A large volume of fluid can flow from input chamber 318 to output chamber 319.

When the plunger of actuator 80 or 81 seals control passages 344A and 344B, pressure builds up in pilot chamber 342 due to the fluid flow from input port 318 through "bleed" groove 338. The increased pressure in pilot chamber 342 together with the force of spring 340 displace linearly, in a sliding motion over guide pin 336, fram member 326 toward sealing lip 325. When there is sufficient pressure in pilot chamber 342, diaphragm-like pliable member 328 seals input port chamber 318 at lip seal 325. The soft member 328 includes an inner opening that is designed with guiding pin 336 to clean groove 338 during the sliding motion. That is, groove 338 of guiding pin 336 is periodically cleaned. Therefore, fram piston 326 is uniquely designed for controlling flow of "unclean" water ("gray water").

The embodiment of FIG. 9 shows the valve having a central input chamber 318 (and guide pin 336) symmetrically arranged with respect to vent passages 344A and 344B (and the location of the plunger of actuator 80). However, the valve device may have input chamber 318 (and guide pin 336) non-symmetrically arranged with respect to passages 344A, 344B and output vent passage 346. That is, in such a design, this valve has input chamber 318 and guide pin 336 non-symmetrically arranged with respect to the location of the plunger of actuator 80. The symmetrical and non-symmetrical embodiments are equivalent.

Figure 9B:
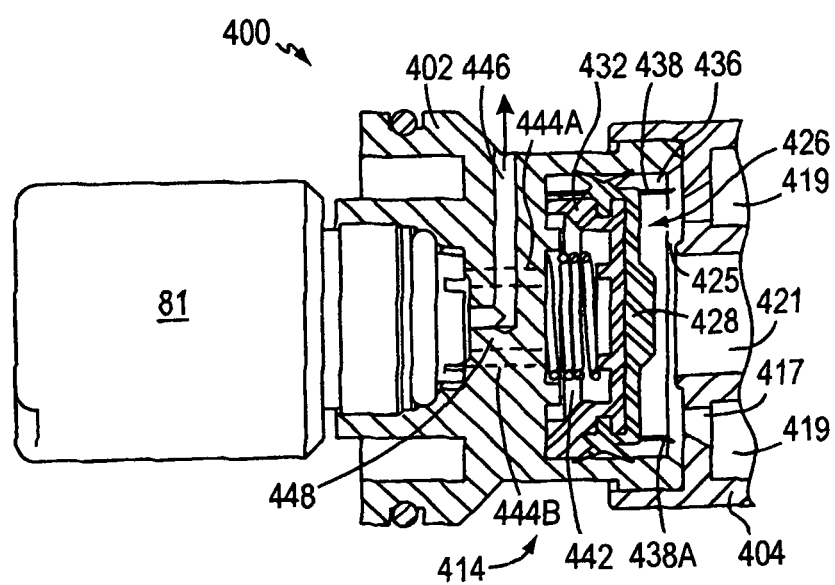
FIG. 9B is an enlarged crossectional view of another embodiment of the moving piston-like member that can be used in the valve shown in FIGS. 8, 8A, and 8B.

FIG. 9B illustrates another embodiment of the "fram piston" valve device. Valve device 400 includes a valve body 413 providing a cavity for a valve assembly 414, an input port 419, and an output port 421. Valve assembly 414 includes a proximal body 402, a distal body 404, and a fram member or assembly 426. Fram member 426 includes a pliable member 428 and a support member 432. Pliable member 428 may be a diaphragm-like member with a sliding seal 430. Support member 432 may be plunger-like member or a piston like member, but having different structural and functional properties than a conventional plunger or piston. Valve body 402 provides a guide surface 436 located on the inside wall that includes one or several grooves 438 and 438A. These are novel grooves constructed to provide fluid passages from input chamber located peripherally (unlike the central input chamber shown in FIG. 9).

Fram member 426 defines a pilot chamber 442 arranged in fluid communication with actuator cavity 450 via control passages 444A and 444B. Actuator cavity 450 is in fluid communication with output chamber 421 via a control passage 446. Groove 438 (or grooves 438 and 438A) provides a communication passage between input chamber 419 and pilot chamber 442. Distal body 404 includes an annular lip seal 425 co-operatively arranged with pliable member 428 to provide a seal between input port chamber 419 and output port chamber 421. Distal body 404 also includes a flow channel 417 providing communication (in the open state) between input chamber 419 and output chamber 421 for a large amount of fluid flow. Pliable member 428 also includes sealing members 429A and 429B (or one sided sealing member depending on the pressure conditions) arranged to provide a sliding seal with respect to valve body, between pilot chamber 442 and input chamber 419. (Of course, groove 438 enables a controlled flow of fluid from input chamber 419 to pilot chamber 442, as described above.) The entire operation of valve device 400 is controlled by a single solenoid actuator that may be an isolated actuator described below (80).

FIGS. 10, 10A, 10B, and 10C illustrate several embodiments of the isolated actuator. Isolated actuator 80 includes solenoid housing 718, a solenoid windings 728 wound about solenoid bobbin 714 and magnet 723 located in a magnet recess 720. Isolated actuator 81 also includes a resiliently deformable O-ring 712 that forms a seal between solenoid bobbin 714 and actuator base 716, and includes a resiliently deformable O-ring 730 that forms a seal between solenoid bobbin 714 and pole piece 725, all of which are held together by a solenoid housing 718. Solenoid housing 718 (i.e., can 718) is crimped at actuator base 716 to hold magnet 723 and pole piece 725 against bobbin 714 and thereby secure windings 728 and actuator base 716 together.

Isolated actuator 81 also includes a resilient membrane 764 that may have various embodiments shown and described in connection with FIGS. 10D and 10E. As shown in FIG. 10, resilient membrane 764 is mounted between actuator base 716 and a piloting button 705 to enclose armature fluid located in a fluid-tight armature chamber in communication with an armature port 752. Resilient membrane 764 includes a distal end 766, O-ring like portion 767 and a flexible portion 768. Distal end 766 comes in contact with the sealing surface in the region 708. Resilient membrane 764 is exposed to the pressure of regulated fluid provided via conduit 706 in piloting button 705 and may therefore be subject to considerable external force. Furthermore, resilient membrane 764 is constructed to have a relatively low permeability and high durability for thousands of openings and closings over many years of operation.

Figure 10:
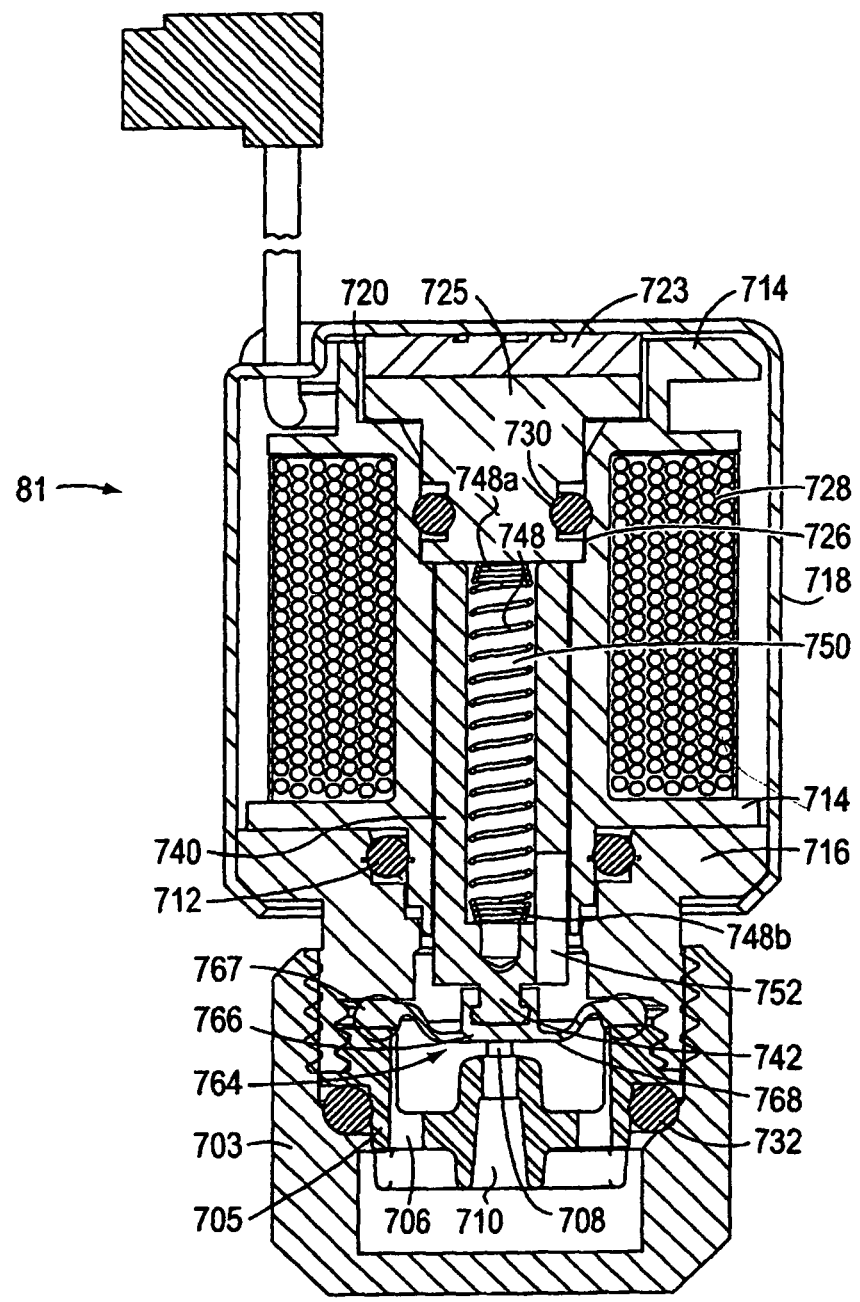
FIG. 10 is a crossectional view of a first embodiment of an electromechanical actuator used in the valve shown in FIGS. 8, 8A and 8B.
Figure 10A:
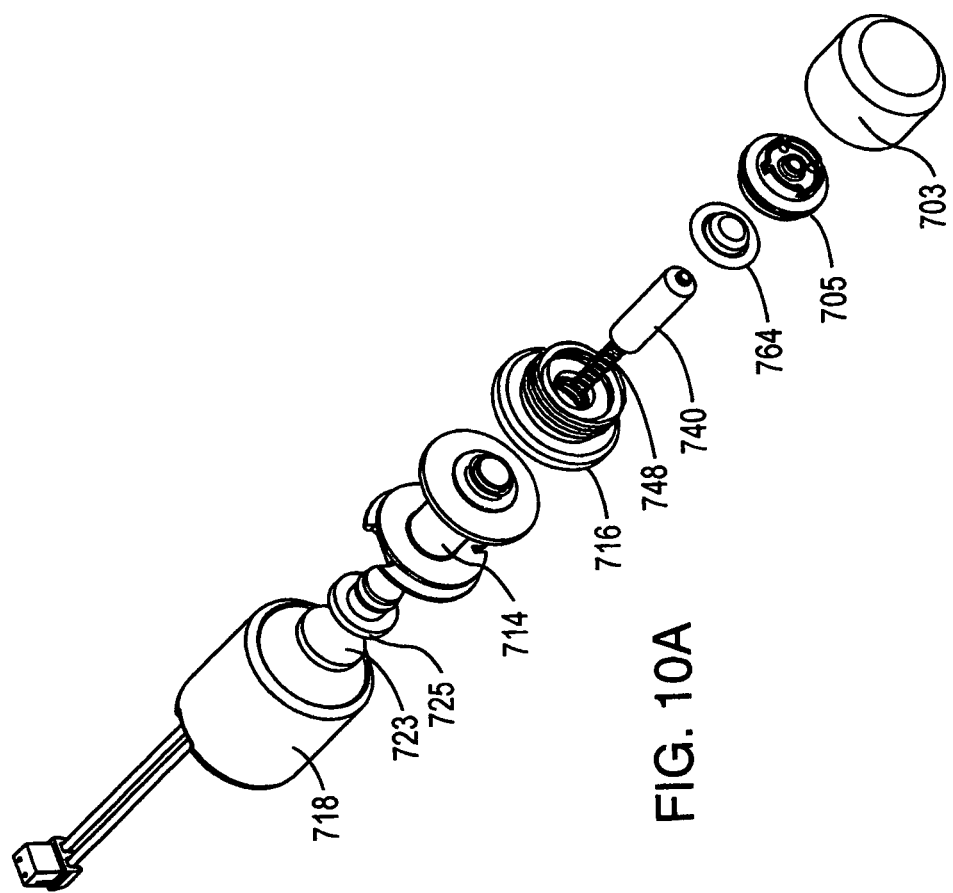
FIG. 10A is a perspective exploded view of the electromechanical actuator shown in FIG. 10.
Figure 10B:
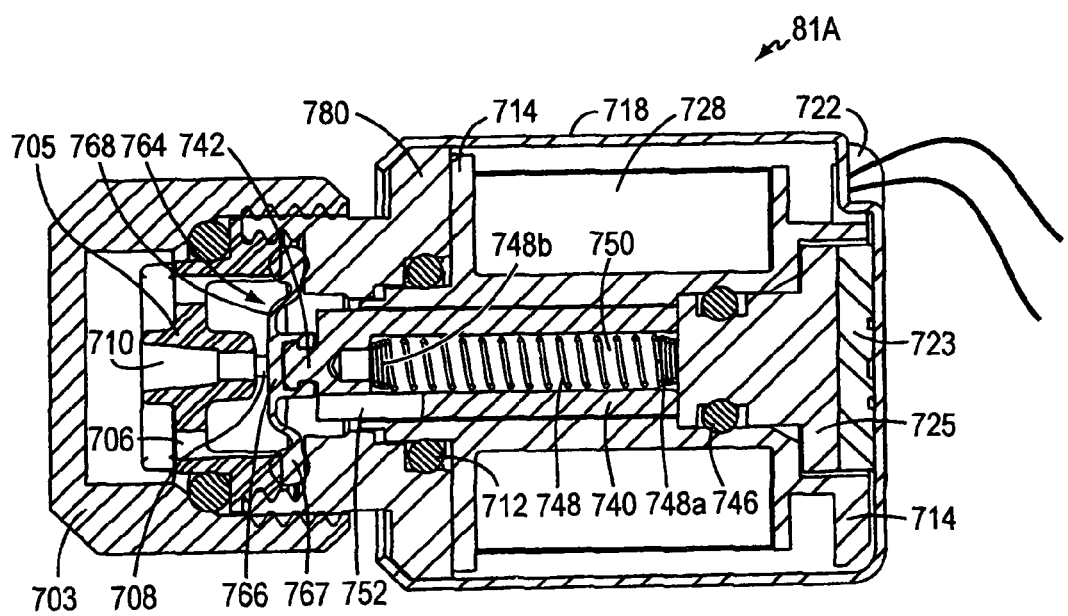
FIG. 10B is a crossectional view of a second embodiment of an electromechanical actuator used in the valve shown in FIGS. 8, 8A and 8B.

Referring to still to FIG. 10, isolated actuator 81 is provided, for storage and shipping purposes, with a cap 703 sealed with respect to the distal part of actuator base 716 and with respect to piloting button 705 using a resiliently deformable O-ring 732. Storage and shipping cap 703 includes usually water that counter-balances fluid contained by resilient membrane 764; this significantly limits or eliminates diffusion of fluid through resilient membrane 764.

Isolated actuator 81 may be constructed either as a latching actuator (shown in FIG. 10) or a non-latching actuator. The latching embodiment includes magnet 723 (as shown) providing magnetic field having orientation and force sufficient to overcome the force of coil spring 748 and thereby retain armature 740 in the open state even after there is no drive current flowing in the solenoid's windings 728.

In the non-latching embodiment, there is no permanent magnet (i.e., no magnet 732). Thus, to keep armature 740 in the open state, a drive current must continue to flow in windings 728 to provide the necessary magnetic field. Armature 740 moves to the closed state under the force of spring 748 if there is no drive current. On the other hand, in the latching embodiment, a drive current is applied to windings 728 in opposite directions to move armature 740 between the open and closed states, but no drive current is necessary to maintain either state.

Referring still to FIG. 10, actuator base 716 includes a wide base portion substantially located inside can 718 and a narrowed base extension threaded on its outer surface to receive cap 703. The inner surface of the base extension threadedly engages complementary threads provided on the outer surface of piloting button 705. Membrane 764 includes a thickened peripheral rim 767 located between the base extension lower face and piloting button 705. This creates a fluid-tight seal so that the membrane protects the armature from exposure to external fluid flowing in the main valve.

For example, the armature liquid may be water mixed with a corrosion inhibitor, e.g., a 20% mixture of polypropylene glycol and potassium phosphate. Alternatively, the armature fluid may include silicon-based fluid, polypropylene polyethylene glycol or another fluid having a large molecule. The armature liquid may in general be any substantially non-compressible liquid having low viscosity and preferably non-corrosive properties with respect to the armature. Alternatively, the armature liquid may be Fomblin or other liquid having low vapor pressure (but preferably high molecular size to prevent diffusion).

If there is anticorrosive protection, the armature material can be a low-carbon steel, iron or any soft magnetic material; corrosion resistance is not as big a factor as it would otherwise be. Other embodiments may employ armature materials such as the 420 or 430 series stainless steels. It is only necessary that the armature consist essentially of a ferromagnetic material, i.e., a material that the solenoid and magnet can attract. Even so, it may include parts, such as, say, a flexible or other tip, that is not ferromagnetic.

Resilient membrane 764 encloses armature fluid located in a fluid-tight armature chamber in communication with an armature port 752 or 790 formed by the armature body. Furthermore, resilient membrane 764 is exposed to the pressure of regulated fluid in the main valve and may therefore be subject to considerable external force. However, armature 740 and spring 748 do not have to overcome this force, because the conduit's pressure is transmitted through membrane 764 to the incompressible armature fluid within the armature chamber. The force that results from the pressure within the chamber therefore approximately balances the force that the conduit pressure exerts.

Referring still to FIGS. 10, 10A, 10B and 10C, armature 740 is free to move with respect to fluid pressures within the chamber between the retracted and extended positions. Armature port 752 or 790 enables the force-balancing fluid displaced from the armature chamber's lower well through the spring cavity 750 to the part of the armature chamber from which the armature's upper end (i.e. distal end) has been withdrawn upon actuation. Although armature fluid can also flow around the armature's sides, arrangements in which rapid armature motion is required should have a relatively low-flow-resistance path such as the one that port 752 or 790 helps form. Similar considerations favor use of an armature-chamber liquid that has relatively low viscosity. Therefore, the isolated operator (i.e., actuator 81) requires for operation only low amounts of electrical energy and is thus uniquely suitable for battery operation.

In the latching embodiment shown in FIG. 10, armature 740 is held in the retracted position by magnet 723 in the absence of a solenoid current. To drive the armature to the extended position therefore requires armature current of such a direction and magnitude that the resultant magnetic force counteracts that of the magnet by enough to allow the spring force to prevail. When it does so, the spring force moves armature 740 to its extended position, in which it causes the membrane's exterior surface to seal against the valve seat (e.g., the seat of piloting button 705). In this position, the armature is spaced enough from the magnet that the spring force can keep the armature extended without the solenoid's help.

To return the armature to the illustrated, retracted position and thereby permit fluid flow, current is driven through the solenoid in the direction that causes the resultant magnetic field to reinforce that of the magnet. As was explained above, the force that the magnet 723 exerts on the armature in the retracted position is great enough to keep it there against the spring force. However, in the non-latching embodiment that doesn't include magnet 723, armature 740 remains in the retracted position only so long as the solenoid conducts enough current for the resultant magnetic force to exceed the spring force of spring 748.

Advantageously, diaphragm membrane 764 protects armature 740 and creates a cavity that is filled with a sufficiently non-corrosive liquid, which in turn enables actuator designers to make more favorable choices between materials with high corrosion resistance and high magnetic permeability. Furthermore, membrane 764 provides a barrier to metal ions and other debris that would tend to migrate into the cavity.

Diaphragm membrane 764 includes a sealing surface 766, which is related to the seat opening area, both of which can be increased or decreased. The sealing surface 766 and the seat surface of piloting button 705 can be optimized for a pressure range at which the valve actuator is designed to operate. Reducing the sealing surface 766 (and the corresponding tip of armature 740) reduces the plunger area involved in squeezing the membrane, and this in turn reduces the spring force required for a given upstream fluid-conduit pressure. On the other hand, making the plunger tip area too small tends to damage diaphragm membrane 764 during valve closing over time. Preferable range of tip-contact area to seat-opening area is between 1.4 and 12.3. The present actuator is suitable for a variety of pressures of the controlled fluid. including pressures about 150 psi. Without any substantial modification, the valve actuator may be used in the range of about 30 psi to 80 psi, or even water pressures of about 125 psi.

Referring still to FIGS. 10, 10A, 10B and 10C, piloting button 705 has an important novel function for achieving consistent long-term piloting of any solenoid valve. Solenoid actuator 81 together with piloting button 705 are installed together as one assembly into the electronic faucet; this minimizes the pilot-valve-stroke variability at the pilot seat in region 708 (FIGS. 10, 10B and 10C) with respect to the closing surface (shown in detail in FIG. 10E), which variability would otherwise afflict the piloting operation. This installation is faster and simpler than prior art installations.

The assembly of operator 81 (or 81A, or 81B) and piloting button 705 is usually put together in a factory and is permanently connected thereby holding diaphragm membrane 764 and the pressure loaded armature fluid (at pressures comparable to the pressure of the controlled fluid). Piloting button 705 is coupled to the narrow end of actuator base 716 using complementary threads or a sliding mechanism, both of which assure reproducible fixed distance between distal end 766 of diaphragm 764 and the sealing surface of piloting button 705. The coupling of operator 81 and piloting button 705 can be made permanent (or rigid) using glue, a set screw or pin. Alternatively, one member may include an extending region that is used to crimp the two members together after screwing or sliding on piloting button 705.

It is possible to install solenoid actuator 81 (or 81A or 81B) without piloting button 705, but this process is somewhat more cumbersome. Without piloting button 705, the installation process requires first positioning the pilot-valve body with respect to the main valve and then securing the actuator assembly onto the main valve as to hold the pilot-valve body in place. If proper care is not taken, there is some variability in the position of the pilot body due to various piece-part tolerances and possible deformation. This variability creates variability in the pilot-valve member's stroke. In a low-power pilot valve, even relatively small variations can affect timing or possibly sealing force adversely and even prevent the pilot valve from opening or closing at all. Thus, it is important to reduce this variability during installation, field maintenance, or replacement. On the other hand, when assembling solenoid actuator 81 (81A or 81B) with piloting button 705, this variability is eliminated or substantially reduced during the manufacturing process, and thus there is no need to take particular care during field maintenance or replacement. In automatic valve 250, piloting button 705 is co-operatively constructed and arranged with the design of cavity 350 and the sealing surface 348 to enable a novel way of assembling a pilot-valve-operated valve 250.

Figure 10C:
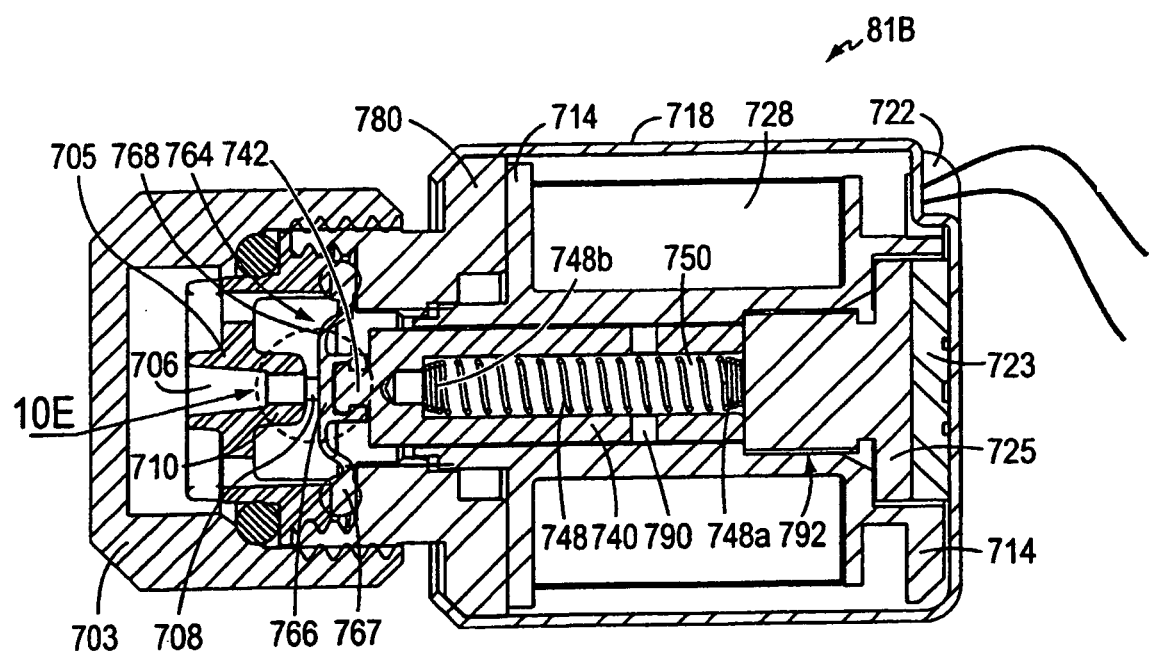
FIG. 10C is a crossectional view of a third embodiment of an electromechanical actuator for controlling the valve shown in FIGS. 8, 8A and 8B.
Figure 10D:
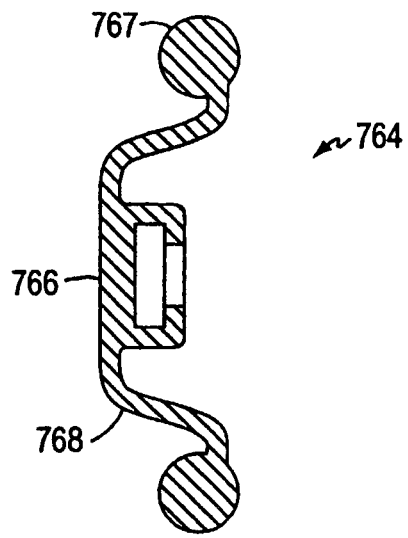
FIG. 10D is a crossectional view of another embodiment of a membrane used in the actuator shown in FIGS. 10, 10A, 10B and 10C.
Figure 10E:
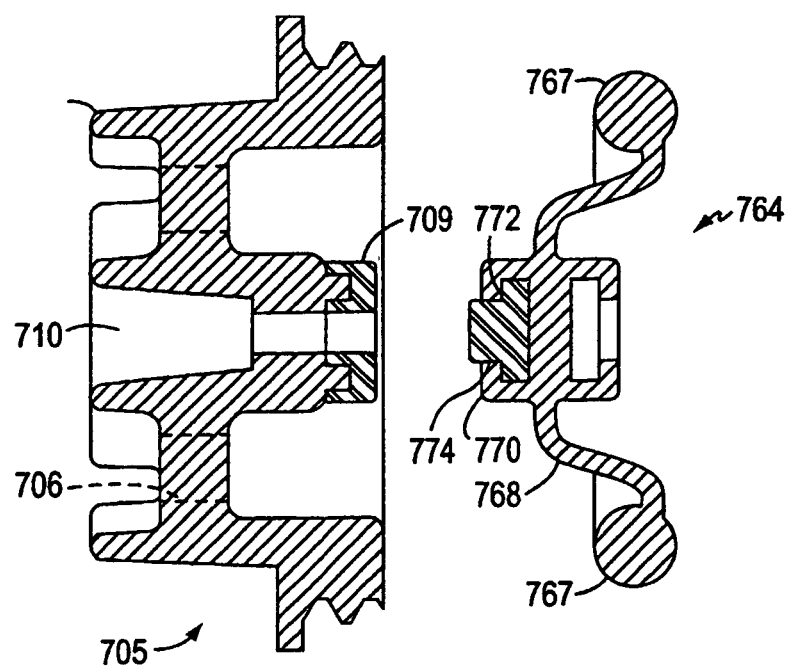
FIG. 10E is a crossectional view of another embodiment of the membrane and a piloting button used in the actuator shown in FIGS. 10, 10B and 10C.

Referring to FIGS. 10D and 10E, as described above, diaphragm membrane 764 includes an outer ring 767, flex region 768 and tip or seat region 766. The distal tip of the plunger is enclosed inside a pocket flange behind the sealing region 766. Preferably, diaphragm membrane 764 is made of EPDM due to its low durometer and compression set by NSF part 61 and relatively low diffusion rates. The low diffusion rate is important to prevent the encapsulated armature fluid from leaking out during transportation or installation process. Alternatively, diaphragm member 764 can be made out of a flouro-elastomer, e.g., VITON, or a soft, low compression rubber, such as CRI-LINE® flouro-elastomer made by CRI-TECH SP-508. Alternatively, diaphragm member 764 can be made out of a Teflon-type elastomer, or to just include a Teflon coating. Alternatively, diaphragm member 764 can be made out of NBR (natural rubber) having a hardness of 40-50 durometer as a means of reducing the influence of molding process variation yielding flow marks that can form micro leaks of the contained fluid into the surrounding environment. Alternatively, diaphragm member 764 can include a metallic coating that slows the diffusion through the diaphragm member when the other is dry and exposed to air during storage or shipping of the assembled actuator.

Preferably, diaphragm member 764 has high elasticity and low compression (which is relatively difficult to achieve). Diaphragm member 764 may have some parts made of a low durometer material (i.e., parts 767 and 768) and other parts of high durometer material (front surface 766). The low compression of diaphragm member 764 is important to minimize changes in the armature stroke over a long period of operation. Thus, contact part 766 is made of high durometer material. The high elasticity is needed for easy flexing of diaphragm member 764 in regions 768. Furthermore, diaphragm part 768 is relatively thin so that the diaphragm can deflect, and the plunger can move with very little force. This is important for long-term battery operation.

Referring to FIG. 10E, another embodiment of diaphragm membrane 764 can be made to include a forward slug cavity 772 (in addition to the rear plunger cavity shaped to accommodate the plunger tip). The forward slug cavity 772 is filled with a plastic or metal slug 774. The forward surface 770 including the surface of slug 774 is cooperatively arranged with the sealing surface of piloting button 705. Specifically, the sealing surface of piloting button 705 may include a pilot seat 709 made of a different material with properties designed with respect to slug 774. For example, high durometer pilot seat 709 can be made of a high durometer material. Therefore, during the sealing action, resilient and relatively hard slug 772 comes in contact with a relatively soft pilot seat 709. This novel arrangement of diaphragm membrane 764 and piloting button 705 provides for a long term, highly reproducible sealing action.

Diaphragm member 764 can be made by a two stage molding process where by the outer portion is molded of a softer material and the inner portion that is in contact with the pilot seat is molded of a harder elastomer or thermoplastic material using an over molding process. The forward facing insert 774 can be made of a hard injection molded plastic, such as acceptable co-polymer or a formed metal disc of a non-corrosive non-magnetic material such as 300 series stainless steel. In this arrangement, pilot seat 709 is further modified such that it contains geometry to retain pilot seat geometry made of a relatively high durometer elastomer such as EPDM 0 durometer. By employing this design that transfers the sealing surface compliant member onto the valve seat of piloting button 705 (rather than diaphragm member 764), several key benefits are derived. Specifically, diaphragm member 764 a very compliant material. There are substantial improvements in the process related concerns of maintaining proper pilot seat geometry having no flow marks (that is a common phenomena requiring careful process controls and continual quality control vigilance). This design enables the use of an elastomeric member with a hardness that is optimized for the application.

However, automatic valve device 250 may be used with other solenoid valves such as the bistable solenoid model no. AXB724 available from Arichell Technologies Inc., West Newton, Mass. Alternatively, actuator 80 may include a latching actuator (as described in U.S. Pat. No. 6,293,516, which is incorporated by reference), a non-latching actuator (as described in U.S. Pat. No. 6,305,662, which is incorporated by reference), or an isolated operator 81 as shown in FIGS. 10 through 10C or described in PCT Application PCT/US01/51098, which is incorporated by reference. In general, a number of solenoid valves may be used such as described in U.S. Pat. No. 4,225,111. An alternative bistable solenoid is described in U.S. Pat. No. 5,883,557 or U.S. Pat. No. 5,599,003.

Figure 11:
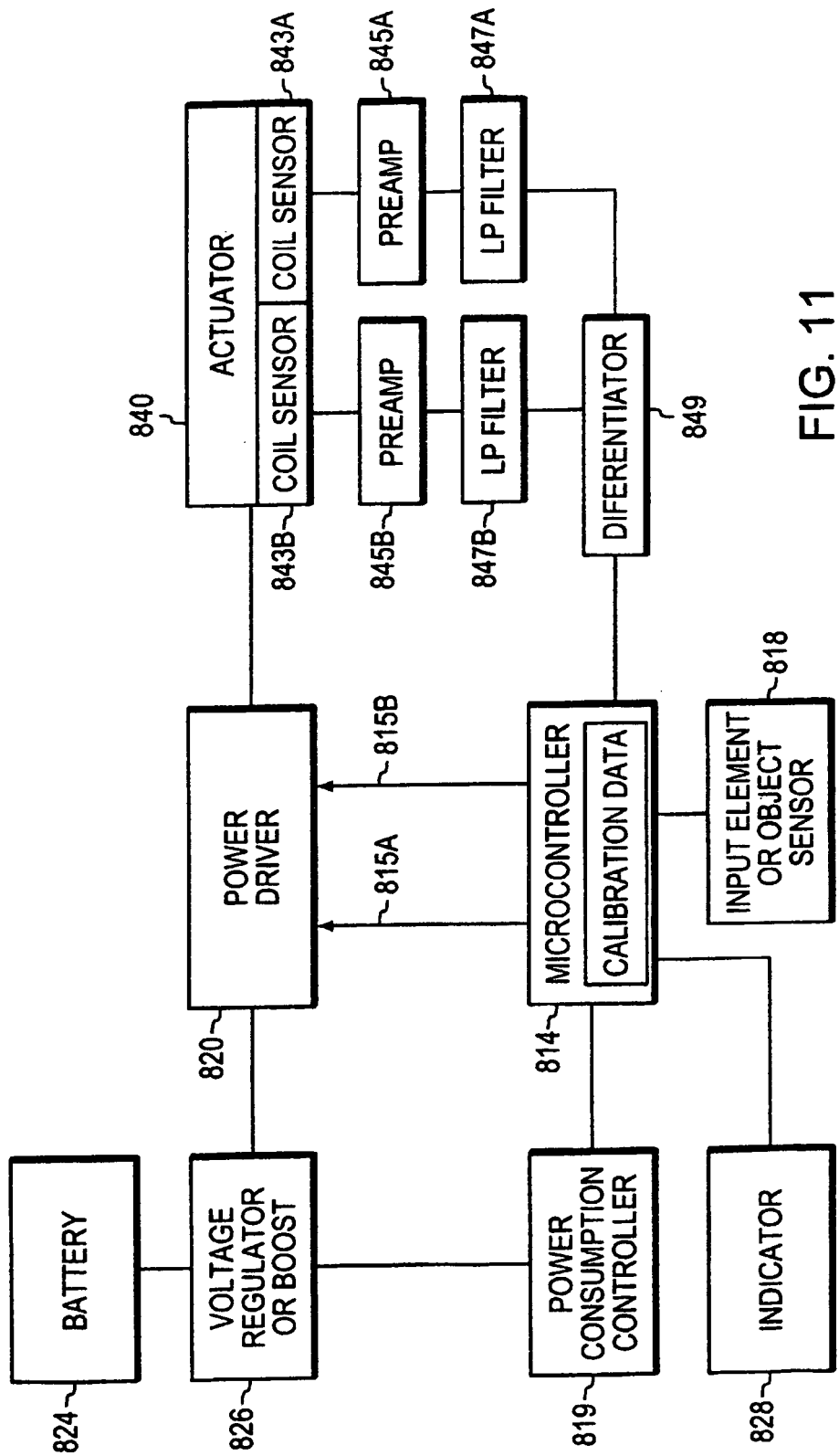
FIG. 11 is a block diagram of a control subsystem for controlling operation of the electromechanical actuator shown in FIG. 10, 10B or 10C.
Figure 12:
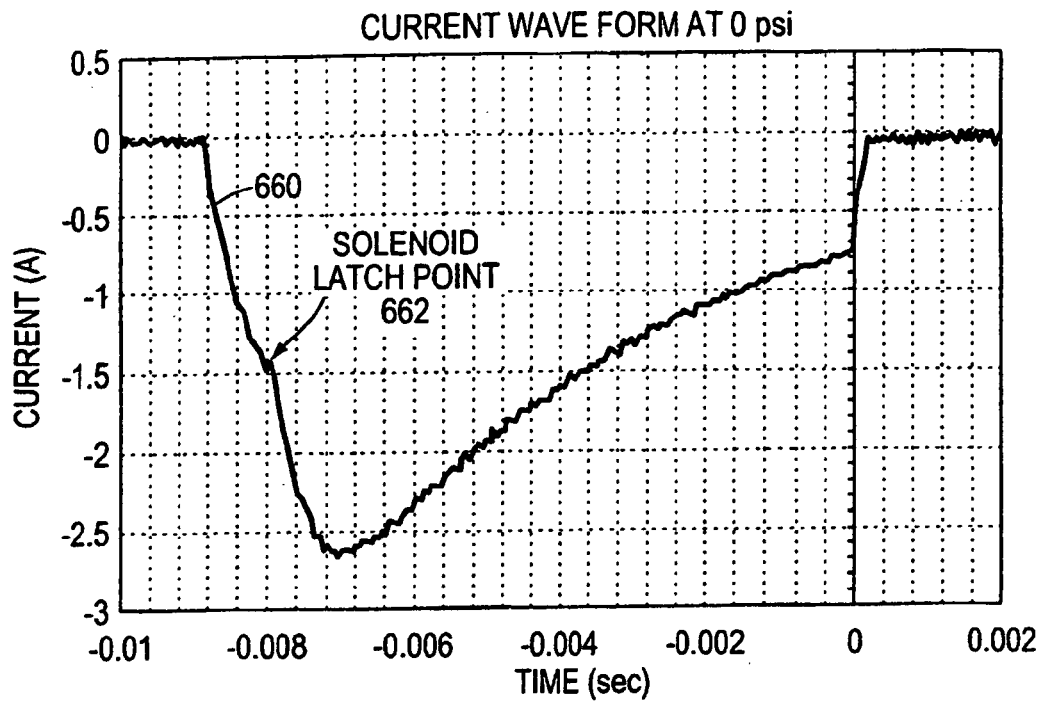
FIGS. 12 and 12A show the relationship of current and time for the valve actuator shown in FIG. 10, 10B or 10C connected to a water line at 0 psi and 120 psi in a reverse flow pressure arrangement, respectively.

FIG. 11 schematically illustrates a fluid flow control subsystem for a latching actuator 81. The flow control system includes again microcontroller 814, sensor or power switch 818, solenoid driver 820. As shown in FIG. 10, latching actuator 81 includes at least one drive coil 728 wound on a bobbin and an armature that preferably is made of a permanent magnet. Microcontroller 814 provides control signals 815A and 815B to current driver 820, which drives solenoid 728 for moving armature 740. Solenoid driver 820 receives DC power from battery 824 and voltage regulator 826 regulates the battery power to provide a substantially constant voltage to current driver 820. Coil sensors 843A and 843B pickup induced voltage signal due to movement of armature 740 and provide this signal to a conditioning feedback loop that includes preamplifiers 845A, 845B and flow-pass filters 847A, 847B. That is, coil sensors 843A and 843B are used to monitor the armature position.

Microcontroller 814 is again designed for efficient power operation. Between actuations, microcontroller 814 goes automatically into a low frequency sleep mode and all other electronic elements (e.g., input element or sensor 818, power driver 820, voltage regulator or voltage boost 826, or signal conditioner) are powered down. Upon receiving an input signal from, for example, a motion sensor, microcontroller 814 turns on a power consumption controller 819. Power consumption controller 819 powers up signal conditioner that provides power to microcontroller 814.

Also referring to FIG. 10, to close the fluid passage 708, microcontroller 814 provides a "close" control signal 815A to solenoid driver 820, which applies a drive voltage to the coil terminals. Provided by microcontroller 814, the "close" control signal 815A initiates in solenoid driver 820 a drive voltage having a polarity that the resultant magnetic flux opposes the magnetic field provided by permanent magnet 723. This breaks the magnet 723's hold on armature 740 and allows the return spring 748 to displace valve member 740 toward valve seat 708. In the closed position, spring 748 keeps diaphragm member 764 pressed against the valve seat of piloting button 705. In the closed position, there is an increased distance between the distal end of armature 740 and pole piece 725. Therefore, magnet 723 provides a smaller magnetic force on the armature 740 than the force provided by return spring 748.

To open the fluid passage, microcontroller 814 provides an "open" control signal 815B (i.e., latch signal) to solenoid driver 820. The "open" control signal 815B initiates in solenoid driver 820 a drive voltage having a polarity that the resultant magnetic flux opposes the force provided by bias spring 748. The resultant magnetic flux reinforces the flux provided by permanent magnet 723 and overcomes the force of spring 748. Permanent magnet 723 provides a force that is great enough to hold armature 740 in the open position, against the force of return spring 748, without any required magnetic force generated by coil 728.

Referring to FIG. 11, microcontroller 814 discontinues current flow, by proper control signal 815A or 815B applied to solenoid driver 820, after armature 740 has reached the desired open or closed state. Pickup coils 843A and 843B (or any sensor, in general) monitor the movement (or position) of armature 740 and determine whether armature 740 has reached its endpoint. Based on the coil sensor data from pickup coils 843A and 843B (or the sensor), microcontroller 814 stops applying the coil drive, increases the coil drive, or reduces the coil drive.

To open the fluid passage, microcontroller 814 sends OPEN signal 815B to power driver 820, which provides a drive current to coil 728 in the direction that will retract armature 740. At the same time, coils 843A and 843B provide induced signal to the conditioning feedback loop, which includes a preamplifier and a low-pass filter. If the output of a differentiator 849 indicates less than a selected threshold calibrated for armature 740 reaching a selected position (e.g., half distance between the extended and retracted position, or fully retracted position, or another position), microcontroller 814 maintains OPEN signal 815B asserted. If no movement of armature 740 is detected, microcontroller 814 can apply a different level of OPEN signal 815B to increase the drive current (up to several times the normal drive current) provided by power driver 820. This way, the system can move armature 740, which is stuck due to mineral deposits or other problems.

Microcontroller 814 can detect armature displacement (or even monitor armature movement) using induced signals in coils 843A and 843B provided to the conditioning feedback loop. As the output from differentiator 849 changes in response to the displacement of armature 740, microcontroller 814 can apply a different level of OPEN signal 815B, or can turn off OPEN signal 815B, which in turn directs power driver 820 to apply a different level of drive current. The result usually is that the drive current has been reduced, or the duration of the drive current has been much shorter than the time required to open the fluid passage under worst-case conditions (that has to be used without using an armature sensor). Therefore, the system of FIG. 8 saves considerable energy and thus extends the life of battery 824.

Advantageously, the arrangement of coil sensors 843A and 843B can detect latching and unlatching movement of armature 740 with great precision. (However, a single coil sensor, or multiple coil sensors, or capacitive sensors may also be used to detect movement of armature 740.) Microcontroller 814 can direct a selected profile of the drive current applied by power driver 820. Various profiles may be stored in, microcontroller 814 and may be actuated based on the fluid type, fluid pressure, fluid temperature, the time actuator 840 has been in operation since installation or last maintenance, a battery level, input from an external sensor (e.g., a movement sensor or a presence sensor), or other factors.

Optionally, microcontroller 814 may include a communication interface for data transfer, for example, a serial port, a parallel port, a USB port, or a wireless communication interface (e.g., an RF interface). The communication interface is used for downloading data to microcontroller 814 (e.g., drive curve profiles, calibration data) or for reprogramming microcontroller 814 to control a different type of actuation or calculation.

Figure 12A:
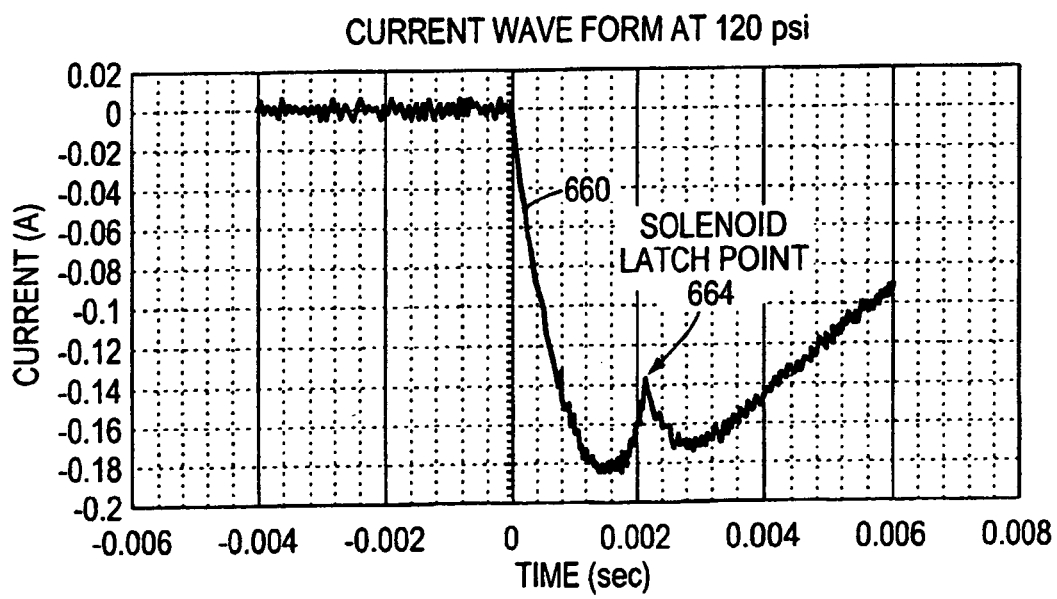
Figure 12B:
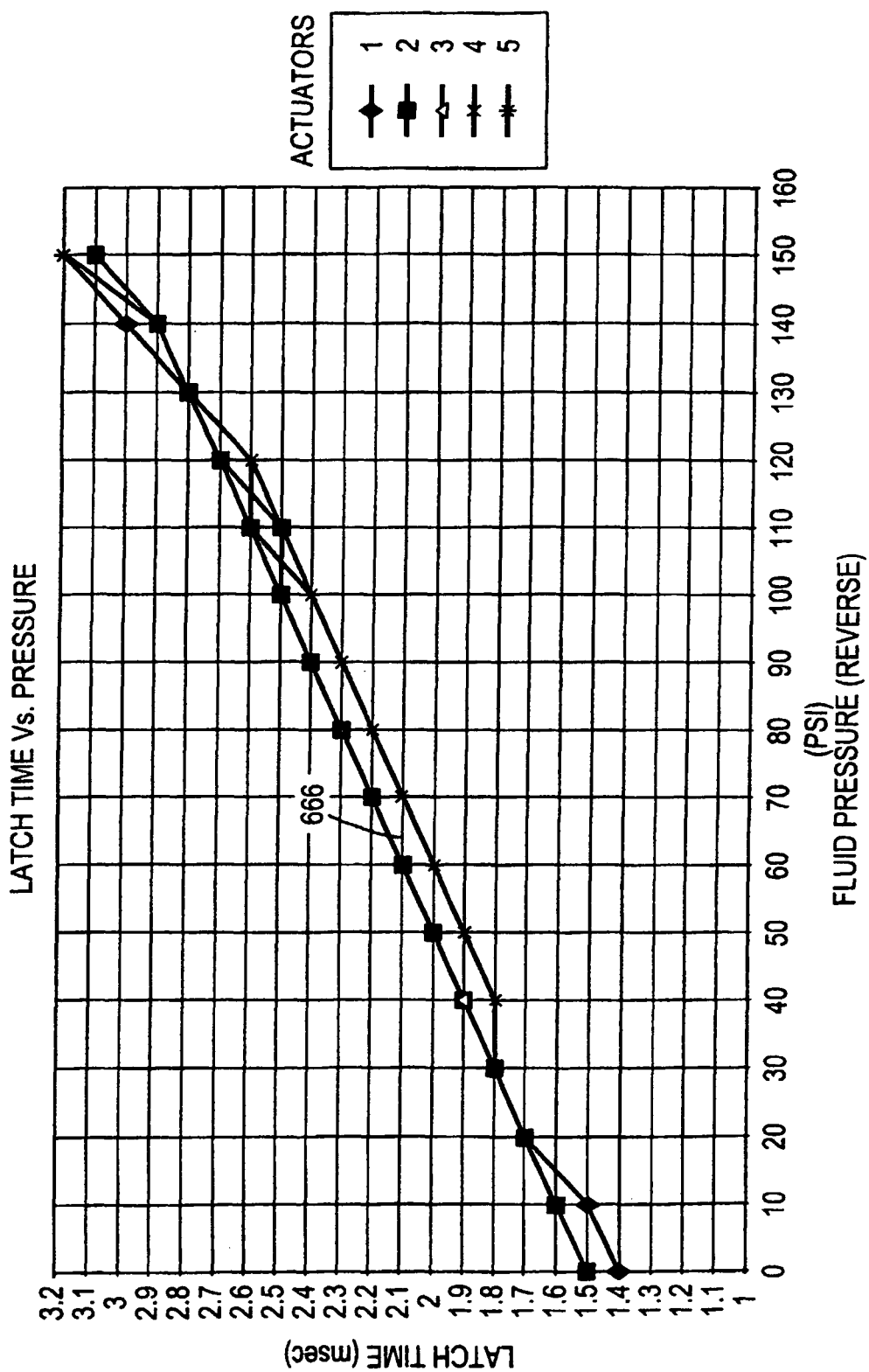
FIG. 12B shows the dependence of the latch time on water pressure (in a reverse flow pressure arrangement) for various actuators.

Referring to FIG. 10, electromagnetic actuator 81 is connected in a reverse flow arrangement when the water input is provided via passage 706 of piloting button 705. Alternatively, electromagnetic actuator 81 is connected in a forward flow arrangement when the water input is provided via passage 710 of piloting button 705 and exits via passage 706. In the forward flow arrangement, the plunger "faces directly" the pressure of the controlled fluid delivered by passage 710. That is, the corresponding fluid force acts against spring 748. In both forward and reverse flow arrangements, the latch or unlatch times depend on the fluid pressure, but the actual latch time dependence is different. In the reverse flow arrangement, the latch time (i.e., time it takes to retract plunger 740) increases with the fluid pressure substantially linearly, as shown in FIG. 12B. On the other hand, in the forward flow arrangement, the latch time decreases with the fluid pressure. Based on this latch time dependence, microcontroller 814 can calculate the actual water pressure and thus control the water amount delivery.

Figure 11A:
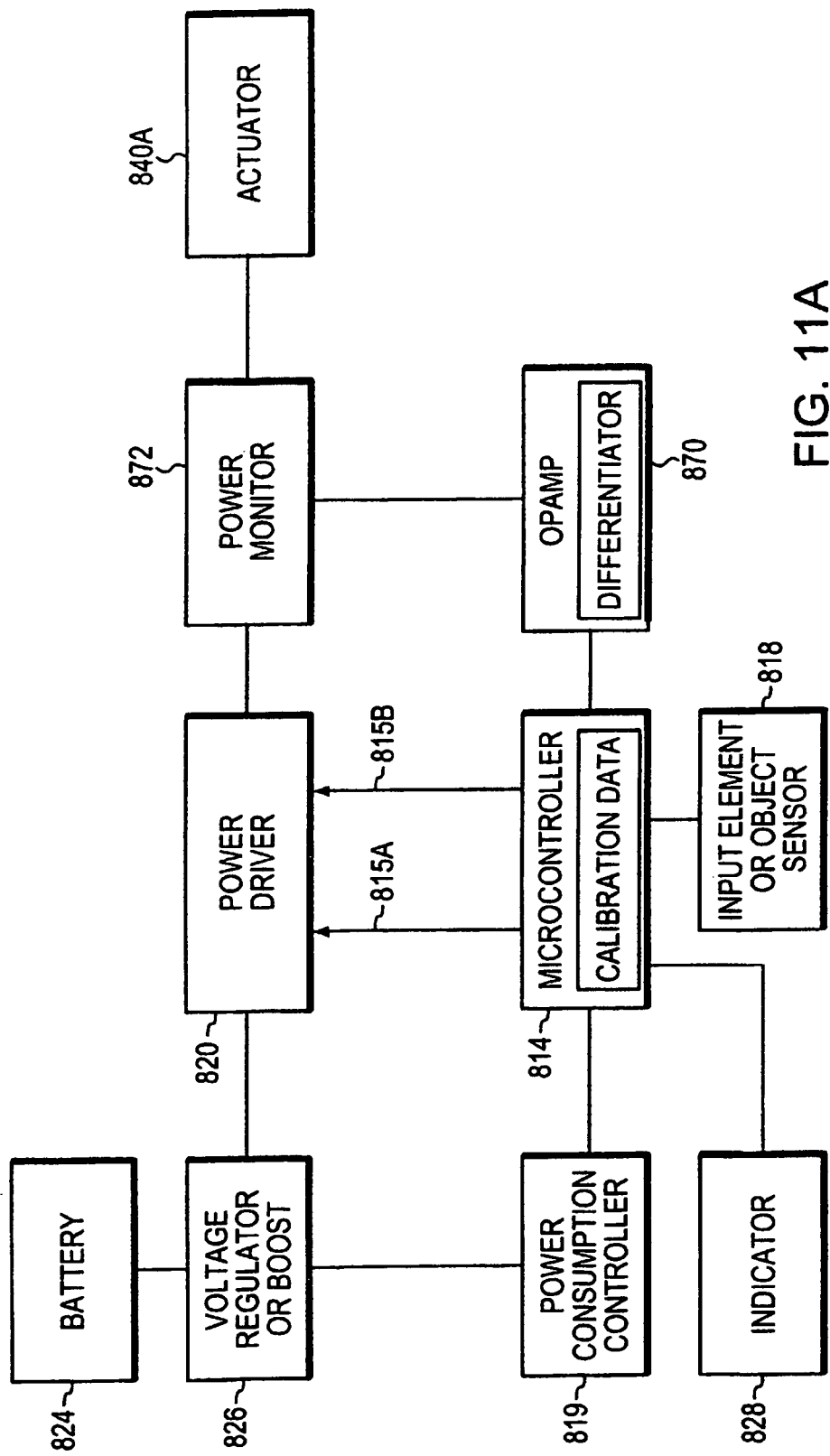
FIG. 11A is a block diagram of another embodiment of a control subsystem for controlling operation of the electromechanical actuator shown in FIG. 10, 10B or 10C.
Figure 11B:
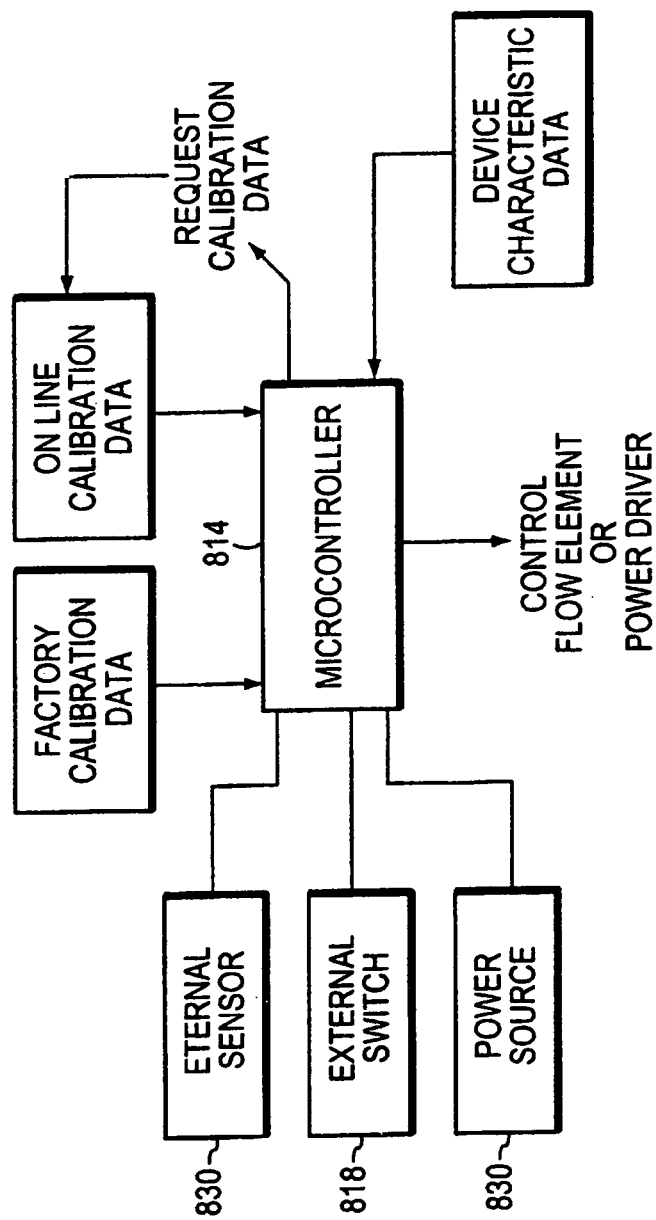
FIG. 11B is a block diagram of data flow to a microcontroller used in the control subsystem of FIG. 11 or 11A.

FIG. 11A schematically illustrates a fluid flow control system for another embodiment of the latching actuator. The flow control system includes again microcontroller 814, power consumption controller 819, solenoid driver 820 receiving power from a battery 824 or voltage booster 826, and an indicator 828. Microcontroller 814 operates in both sleep mode and operation mode, as described above. Microcontroller 814 receives an input signal from an input element 818 (or any sensor) and provides control signals 815A and 815B to current driver 820, which drives the solenoid of a latching valve actuator 81. Solenoid driver 820 receives DC power from battery 824 and voltage regulator 826 regulates the battery power. A power monitor 872 monitors power signal delivered to the drive coil of actuator 81 and provides a power monitoring signal to microcontroller 814 in a feedback arrangement having operational amplifier 870. Microcontroller 814 and power consumption controller 819 are designed for efficient power operation, as described above.

Also referring to FIG. 11A, to close the fluid passage, microcontroller 814 provides a "close" control signal 815A to solenoid driver 820, which applies a drive voltage to the actuator terminals and thus drives current through coil 728. Power monitor 872 may be a resistor connected for applied drive current to flow through (or a portion of the drive current). Power monitor 872 may alternatively be a coil or another element. The output from power monitor 872 is provided to the differentiator of signal conditioner 870. The differentiator is used to determine a latch point, as shown in FIG. 12A.

Similarly as described in connection with FIG. 11, to open the fluid passage, microcontroller 814 sends CLOSE signal 815A or OPEN signal 815B to valve driver 820, which provides a drive current to coil 728 in the direction that will extent or retract armature 740 (and close or open passage 708). At the same time, power monitor 872 provides a signal to opamp 870. Microcontroller 814 determines if armature 740 reached the desired state using the power monitor signal. For example, if the output of opamp 870 initially indicates no latch state for armature 740, microcontroller 814 maintains OPEN signal 815B, or applies a higher level of OPEN signal, as described above, to apply a higher drive current. On the other hand, if armature 740 reached the desired state (e.g., latch state shown in FIG. 12 as point 662, and shown in FIG. 12A as point 664), microcontroller 814 applies a lower level of OPEN signal 815B, or turns off OPEN signal 815B. This usually reduces the duration of drive current or the level of the drive current as compared to the time or current level required to open the fluid passage under worst-case conditions. Therefore, the system of FIG. 12A saves considerable energy and thus extends life of battery 824.

FIG. 12B shows the pressure dependence of the latch time. Based on curve 666, the microcontroller can calculate the input pressure at membrane 764. Specifically, after the solenoid of the actuator is activated, microcontroller 814 searches for the latching point 662 in FIG. 12 or point 664 in FIG. 12A. When the timer reaches the latching point, microcontroller 814 deactivates the solenoid. Based on the latch time, microcontroller 814 calculates the corresponding water pressure, using stored calibration data. Based on the water pressure and the size of the orifices, the system delivers a known amount of water discharged by the sprinkler (or another water delivery unit).

While the invention has been described with reference to the above embodiments, the present invention is by no means limited to the particular constructions described and/or shown in the drawings. In any additional equivalent embodiment, any one of the above-described elements may be replaced by one or more equivalent elements, or similarly any two or more of the above-described elements may be replaced by one equivalent element. The present invention also comprises any modifications or equivalents within the scope of the following claims.

What is claimed is:

1. An electrically operated valve for a water delivery system, comprising:
   a valve body having a water inlet and a water outlet separated by a valve closure surface,
   a valve closure element located within said valve body and constructed to move within a cavity of said valve body between an open state enabling water flow from said inlet to said outlet and a closed state preventing said water flow from said inlet to said outlet, said valve closure element including
      a fram member and a sliding seal freely sliding with respect to a surface of said cavity for providing two pressure zones isolated by said sliding seal acting on an inner surface of said valve body, entire said fram member and entire said sliding seal being slidably movable within said cavity, said fram member including a pliable member and a stiff member, said pliable member being constructed to come in contact with said valve closure surface to form said seal preventing water flow from said water inlet to said water outlet,
      a pin fixedly arranged with respect to said valve body and including a groove extending over said two pressure zones to provide a water passage between said two zones, said groove providing hydraulic communication between said two pressure zones, and
      a spring biased to assist movement of said valve closure element;
   an electromagnetic actuator including an armature housing, an armature including ferromagnetic material, and a solenoid coil operable by application of a coil drive to linearly displace said armature coupled to a linearly movable plunger having a sealing member attached to its distal end and operating between retracted and extended positions;
   a pilot mechanism constructed to control hydraulically said movement of said valve closure element between said open state and said closed state based on a position of said sealing member of said plunger of said electromagnetic actuator thereby changing pressure in one of said two pressure zones by releasing water from said one pressure zone;
   a control circuit constructed to provide current to said electromagnetic actuator; and
   a communication interface, including a wireless communication unit, constructed and arranged to provide data to and from a microcontroller coupled to said control circuit; said microcontroller being programmed to request and receive calibration data for controlling operation of said actuator to deliver a known amount of water from said inlet to said outlet at different water pressures at said water inlet, wherein said wireless communication unit sends and receives said calibration data and device specific data, said microcontroller being programmed for controlling different types of actuation by said electromagnetic actuator thereby delivering different amounts of water at different water pressures.

2. The electrically operated valve of claim 1, wherein said wireless communication unit sends data to and receives said calibration data and said device specific data to and from a central communication unit communicating wirelessly with several valves controlling water flow, each valve being controlled by said microcontroller being programmed for controlling different types of actuation by said electromagnetic actuator thereby delivering different amounts of water at different water pressures.

3. A valve control system, comprising:
   a valve body having a water inlet and a water outlet,
   a valve closure element located within said valve body and constructed to move within a cavity of said valve body between an open state enabling water flow from said inlet to said outlet and a closed state preventing said water flow from said inlet to said outlet;
   said valve closure element being constructed to move to an open position enabling fluid flow from said fluid input port to said fluid output port upon reduction of pressure in a first zone of two water pressure zones; and being constructed to move to a closed position, upon increase of pressure in said first pressure zone;
   an electromagnetic actuator including an armature housing, an armature including ferromagnetic material, and a solenoid coil operable by application of a coil drive to linearly displace said armature coupled to a linearly movable sealing member attached to its distal end and operating between retracted and extended positions to control hydraulically operation of said valve closure element;
   a control circuit constructed to provide current to said electromagnetic actuator;
   a sensor;
   a microcontroller coupled to said control circuit and to said sensor, said sensor providing periodically sensor data to said microcontroller; and
   a communication interface, including a wireless communication unit, constructed and arranged to provide data to and from said microcontroller; said microcontroller being programmed to request and receive calibration data for controlling operation of said actuator to deliver a known amount of water from said inlet to said outlet at different water pressures at said water inlet, wherein said wireless communication unit sends and receives said calibration data and device specific data, said microcontroller being programmed for controlling different types of actuation by said electromagnetic actuator thereby delivering different amounts of water at different water pressures.

4. The valve control system of claim 3 wherein said control circuit includes a power consumption controller.

5. The valve control system of claim 3 wherein said control circuit includes a voltage regulator.

6. The valve control system of claim 3 wherein said valve body includes a valve closure surface and said valve closure element includes a pliable member and a stiff member, said pliable member being constructed to come in contact with said valve closure surface to form said seal in said closed position.

7. The valve control system of claim 3 including a bias member constructed and arranged to assist movement of said valve closure element from said open position to said closed position.

8. The valve control system of claim 3 wherein said valve closure element includes a fram member and a sliding seal acting on a surface of said cavity for providing said two pressure zones and being slidably movable within said cavity with respect to a guiding member; said fram member being constructed to move to an open position enabling fluid flow from said fluid input port to said fluid output port upon reduction of pressure in said first zone of said pressure zones; and being constructed to move to a closed position, upon increase of pressure in said first pressure zone, wherein said sliding seal is constructed to isolate said first pressure zone from said second pressure zone; and said guiding member includes a pin including a groove extending between said two pressure zones and providing a water passage.

9. The valve control system of claim 3 wherein said sensor includes a motion sensor and said microcontroller being programmed to transition from a low frequency sleep mode to an operation mode based on data from said motion sensor.

10. The valve control system of claim 3 wherein said electromagnetic actuator, said control circuit and said microcontroller are connected in a feed-back arrangement including a feedback loop.

11. The valve control system of claim 3, wherein said sensor includes an armature sensor.

12. The valve control system of claim 3 wherein said wireless communication unit sends data to and receives said calibration data and said device specific data to and from a central communication unit communicating wirelessly with several valves controlling water flow, each valve being controlled by said microcontroller being programmed for controlling different types of actuation by said electromagnetic actuator thereby delivering different amounts of water at different water pressures.

\* \* \* \* \*